(12) United States Patent
Asami

(10) Patent No.: US 7,146,095 B2
(45) Date of Patent: Dec. 5, 2006

(54) INFORMATION PROVIDING SYSTEM, INFORMATION PROVIDING APPARATUS AND INFORMATION PROVIDING METHOD AS WELL AS DATA RECORDING MEDIUM

(75) Inventor: Akiko Asami, Shizuoka (JP)

(73) Assignee: Sony Corporation (JP)

( * ) Notice: Subject to any disclaimer, the term of this patent is extended or adjusted under 35 U.S.C. 154(b) by 833 days.

(21) Appl. No.: 09/950,138

(22) Filed: Sep. 10, 2001

(65) Prior Publication Data

US 2002/0066105 A1     May 30, 2002

(30) Foreign Application Priority Data

Sep. 12, 2000   (JP)   ............................. 2000-276890

(51) Int. Cl.
*H04N 5/91*   (2006.01)
(52) U.S. Cl. .......................... 386/95; 386/125; 386/126
(58) Field of Classification Search ........ 345/848–852, 345/733, 764, 744–747, 700, 961, 419; 709/201–203; 386/46, 95, 125, 126, 96; 369/47.15; 715/706, 715/745, 848, 849; 700/245; *H04N 5/91*
See application file for complete search history.

(56) References Cited

U.S. PATENT DOCUMENTS

| | | | |
|---|---|---|---|
| 6,273,815 B1 * | 8/2001 | Stuckman et al. .............. 463/9 |
| 6,311,195 B1 * | 10/2001 | Hachiya et al. .............. 715/512 |
| 6,313,843 B1 * | 11/2001 | Tanii et al. .................. 345/473 |
| 6,449,227 B1 * | 9/2002 | Heo ......................... 369/47.15 |
| 6,449,518 B1 * | 9/2002 | Yokoo et al. .................. 700/86 |
| 6,527,610 B1 * | 3/2003 | Hornsby et al. ............. 446/175 |
| 6,560,511 B1 * | 5/2003 | Yokoo et al. ................ 700/245 |
| 6,722,989 B1 * | 4/2004 | Hayashi ........................ 463/43 |
| 6,748,326 B1 * | 6/2004 | Noma et al. .................... 702/3 |
| 6,772,121 B1 * | 8/2004 | Kaneko ........................ 704/270 |
| 2002/0007312 A1 * | 1/2002 | Yokogawa .................... 705/14 |
| 2002/0028704 A1 * | 3/2002 | Bloomfield et al. ........... 463/1 |
| 2004/0170393 A1 * | 9/2004 | Heo ........................... 386/96 |

FOREIGN PATENT DOCUMENTS

EP         001085438 A2 *   3/2001

\* cited by examiner

*Primary Examiner*—Sy D. Luu
(74) *Attorney, Agent, or Firm*—Lerner, David, Littenberg, Krumholz & Mentlik, LLP

(57) ABSTRACT

An information providing system, apparatus, and method, and a data recording medium wherein a user can frequently communicate with an imaginary electronic pet that virtually lives in a piece of electric equipment so that the user can operate the electric equipment with increased interest and happiness. The system includes a plurality of interconnected pieces of electric equipment for transmitting and receiving character data. Each piece of equipment includes a character system for processing the character data, a representation system for representing a character to indicate a representation to a user of the electric equipment, and a connection system for establishing a connection to another piece of equipment. The character system rocesses the character data based on character representation data for providing the character with a predetermined representation, and the representation system provides information from the character to the user.

25 Claims, 19 Drawing Sheets

| OPERATION 1 | xxx21 ADDRESS | | |
|---|---|---|---|
| OPERATION 2 | xxx22 ADDRESS | | |
| OPERATION 3 | REPRESENTATION 1 | xxx11 ADDRESS | |
| OPERATION 4 | REPRESENTATION 2 | xxx12 ADDRESS | |
| OPERATION 5 | REPRESENTATION 3 | xxx13 ADDRESS | |
| OPERATION 6 | REPRESENTATION 4 | EXPRESSION 1 | xxx01 ADDRESS |
| OPERATION 7 | REPRESENTATION 5 | EXPRESSION 2 | xxx02 ADDRESS |
| OPERATION 8 | REPRESENTATION 6 | EXPRESSION 3 | xxx03 ADDRESS |
| | REPRESENTATION 7 | EXPRESSION 4 | xxx04 ADDRESS |
| | REPRESENTATION 8 | EXPRESSION 5 | xxx05 ADDRESS |
| | | EXPRESSION 6 | xxx06 ADDRESS |
| | | EXPRESSION 7 | xxx07 ADDRESS |
| | | EXPRESSION 8 | xxx08 ADDRESS |

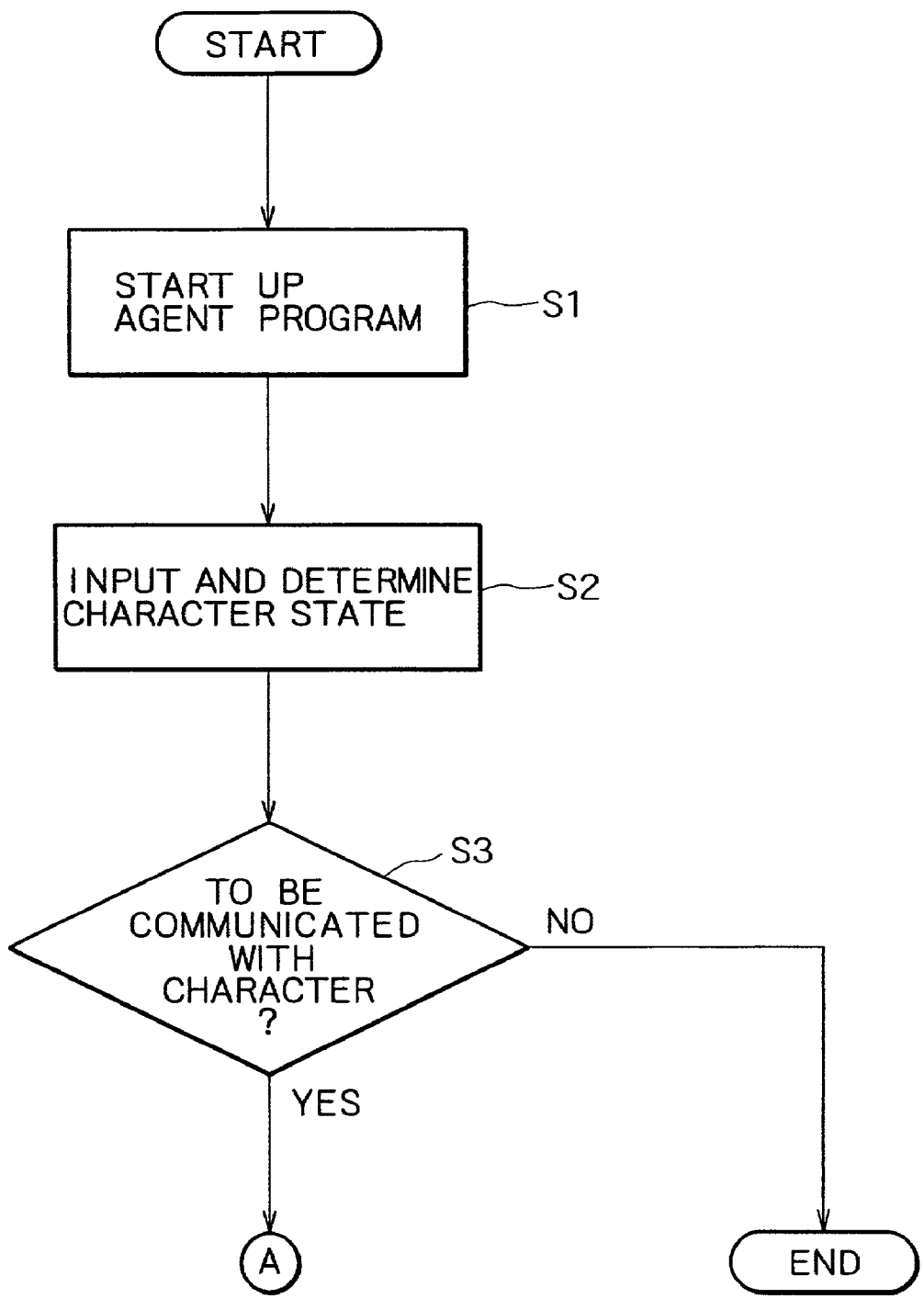

INFORMATION PROVIDING SYSTEM, INFORMATION PROVIDING APPARATUS AND INFORMATION PROVIDING METHOD AS WELL AS DATA RECORDING MEDIUM

BACKGROUND OF THE INVENTION

This invention relates to an information providing system, an information providing apparatus and an information providing method as well as a data recording medium for use with an electric equipment, and more particularly to an information providing system, an information providing apparatus and an information providing method as well as a data recording medium wherein an electronic pet (hereinafter referred to as "character") which is an imaginary living body can be used as a communication tool to collect and store information of a plurality of electric equipments, output the stored information, extract unique information from a user, provide useful information to the user based on the information unique to the user and exchange information with others.

A plurality of electric equipments are usually connected to each other to transfer data between them in an ordinary home. For example, a television set and digital camera are connected to each other the plug such that a video picked up using the digital camera is displayed on the television screen, or a video picked up using a video camera is fetched into and edited on a personal computer. The hot plug is a plug having a hot swap function and allows, for example, additional connection or disconnection of a hard disk or a peripheral equipment of a computer while the power supply to the computer remains connected. As such hot plugs, hot plugs compliant with the IEEE 1394 standards, the USB (Universal Serial Bus) standards and so forth are conventionally known.

Particularly at present, standardized specifications for a hot plug are available, and hot plugs which allow transfer of a large amount of data have been developed and allow simple connection and data transfer between a plurality of electric equipments.

However, if plural equipments between which data are to be transferred are located at places spaced away from each other such as a living room and a bed room even in the same house or if it is intended to output data at a place at which an equipment from which data are to be transferred such as, for example, a video camera is not present, then, for example, a video camera or a digital camera body must be carried to the place at which data are to be outputted and connected to a television set or the like as an outputting apparatus so that data are outputted from the outputting apparatus.

Since an equipment from which data are to be signaled must conventionally be carried in this manner, time is required therefor. Further, such carrying of an equipment gives rise to another disadvantage that the equipment being carried may be dropped and damaged or the equipment may be left at the place to which it was carried and therefore is looked for in order to use it subsequently.

Not only a user can go to a place at which information is to be outputted so that information may be outputted as described above, but also it is possible at present for the user to transfer data to a remote place while the user remains at home thanks to popularization of communication networks such as the Internet. In this instance, however, the user must fetch data once into a personal computer and transmit the data after the data are compressed if necessary.

In this manner, according to the prior art, a user is required to have some knowledge of a personal computer regarding transmission/reception of data and is obliged to spend considerable time. Therefore, countermeasures for allowing data to be transferred more simply and easily are demanded.

Further, a plurality of electric equipments are often connected to each other in a home or the like, and the user sometimes uses a hot plug to newly connect a different electric equipment or disconnect one of the electric equipments without being particularly conscious of the connection geometry. Therefore, the user cannot sometimes grasp which plural electric equipments are connected to one another. Particularly, when the user is enjoying a drama of a video tape or a DVD (Digital Versatile Disk) on a television set, if information having no relation to the drama such as, for example, information of serious news is generated, then the information cannot be acquired disadvantageously unless the playback of the drama from the video tape or DVD is stopped. Further, for example, when a user is enjoying a baseball game on a television set, if the user changes the television channel intermediately to newly enjoy an animation, then the user cannot acquire information regarding the baseball game disadvantageously.

Also switching on-off of a switch of an electric equipment in a home sometimes gives rise to a problem. In particular, with regard to an electric equipment which usually displays a screen or generates sound such as a television set, the problem that the user misses to disconnect the power supply to the electric equipment does not occur very likely because the user can visually or audibly recognize such a screen or sound. However, with regard to another electric equipment which does not involve such screen display or sound generation, the user may possibly miss to disconnect the power supply disadvantageously. Therefore, when the user goes out, the user is likely to disconnect the power supply to a television set and the like, but after the user goes out, the user may possibly feel anxiety about such missing to disconnect the power supply to some other electric equipment.

Further, many people in the society at present feel some stress, and personality, videos and music of the type by which such stresses are likely to be cured are accepted widely in the society. Also to keep a pet effectively calms down the heart of the keeping person. However, those people who want but cannot keep a pet from a residential limitation are increasing.

SUMMARY OF THE INVENTION

It is an object of the present invention to provide an information providing system, an information providing apparatus and an information providing method as well as a data recording medium by which the user can frequently communicate with a character which is an electronic pet as an imaginary living body and virtually lives in an electric equipment so that the user can operate the electric equipment with increased interest and happiness.

It is another object of the present invention to provide an information providing system and an information providing apparatus by which a character can freely move between different electric equipments and can be represented on an electric equipment owned by a user.

It is a further object of the present invention to provide an information providing system and an information providing apparatus by which a character familiar to a user can move freely between different electric equipments such that it can be displayed and stored together with an image to be picked up by an electric equipment such as an image pickup apparatus owned by the user.

It is a still further object of the present invention to provide an information providing system and an information providing apparatus by which a connection state of an electric equipment and/or information of each of the electric equipment can be represented when it is tried to use another electric equipment or disconnect the power supply.

In order to attain the objects described above, according to an aspect of the present invention, there is provided an information providing system, comprising a plurality of electric equipments connected to each other for transmitting and receiving character data therebetween, each of the electric equipments including a character system for processing the character data, representation means for representing a character to indicate a representation to a user of the electric equipment, and connection means for establishing connection to another one of the electric equipments, the character data being transmitted and received in such a manner as to move between the electric equipments through the connection means, the character system processing the character data based on character representation data for providing the character with a predetermined representation, and the representation means providing information from the character to the user.

With the information providing system, the character data of the character are signaled from one of the electric equipments to another one of the electric equipments, and on the latter electric equipment, information is provided through the character to the user based on character representation data. To this end, for example, the character appears on an electric equipment on which information is to be provided to its user through the character, for example, at a corner of a television screen and acquires various kinds of information or provides information acquired thereby to the user.

The representation means of any of the electronic equipments may include a display section for visually displaying the character to the user or a sound generation section for causing the user to audibly recognize the presence of the character. With the information providing system, the character can be represented not only in a form wherein it is recognized through the sense of sight but also in another form wherein it is represented in the form of particular sound, voice or the like. Accordingly, even if the electric equipment does not have a displaying function, if it is modified so as to have sound generation means like a speaker, then the character can be represented.

Preferably, the character is represented by the display section in such a manner as to be represented in an overlapping relationship with other image data or by the sound generation section in such a manner as to be sounded in an overlapping relationship with other sound data. Where the character is represented in this manner, if the electric equipment is, for example, a video recorder or a digital camera, the character is displayed on the display section in an overlapping relationship with an object being picked up by the video recorder or digital camera, and the character in the state wherein it is represented in an overlapped relationship with the picked up image of the object is recorded into a recording medium such as a video tape, a DVD (Digital Versatile Disk), a memory stick or a RAM (Read Only Memory). In this manner, the character can be represented in such a manner that it is imaged together with an object of image pickup by a video recorder, a digital camera or the like.

Preferably, the connection means includes an interface which is formed as a hot plug compliant with the IEEE 1394 standards or the USB standards.

Preferably, the character representation data include at least character rule data for determining a manner of the character, user attribute information including a user profile, and providing information to be provided to the user, and the character system includes a character rule storage section, a user attribute information storage section, and a providing information storage section. With the information providing system, the character can be provided with various variations in terms of the costume, shape, color, attachment and so forth as visual factors by the character rule storage section or can be provided with various sounds, voices and so forth as auditory factors. Thus, the character can be represented in various forms.

Preferably, the character representation data further include a keyword indicative of an object of interest of the user, and the character system further includes a keyword storage section. With the information providing system, the character can be represented in various forms in conformity with the liking of the user acquired through conversation between the character and the user and so forth based on the keyword stored in the keyword storage section to provide various kinds of information favorable to the user thereby to arouse interest of the user.

The user attribute information may be obtained by collecting data based on answers inputted by the user to questioning items provided from the character to the user. Where the user attribute information is obtained through the question-to-answer process between the character and the user in this manner, the liking and so forth of the user can be obtained positively.

Preferably, the keyword is produced based on the user attribute information. The user attribute information includes the user profile and the information obtained through the question-to-answer process as described above. From the user profile, user attribute information can be obtained in a standardized manner. Meanwhile, an answer to a question issued to the user is based on information issued intentionally or unconsciously during conversion with the character and represents the liking of the user well. Consequently, the keyword produced in this manner allows provision of information comparatively favorable to the liking of the user.

Preferably, the character representation data are stored in a storage medium which can be carried together with the character data such that the character representation data can be outputted by disconnecting the storage medium from one of the electric equipments and connecting the storage medium to another one of the electric equipments. With the information providing system, it is possible to move the character data stored in the recording medium to an electric equipment which is not connected to the information providing system through the connection means such that the character, which has become favorable to the user through repetitive utilization thereof on one of the electric equipments of the information providing system, is imaged, upon image pickup of an image pickup object by another electric equipment such as, for example, a video camera, in an overlapping relationship with the image pickup object and the character data and the picked up image data of the image of the image pickup object are recorded in an overlapping relationship together with each other as recording data.

Preferably, the character representation data can be transmitted from one of the electric equipments to another one of the electric equipments making use of a communication network including the Internet. Where the communication network including the Internet is used in this manner, the character can be signaled to any other electric equipment without paying any attention to the distance or the time.

Preferably, desired information is selected from within media information such as information of a television broadcast based on the keyword and is provided to the user through the character. Where desired information is selected from within media information such as information of a television broadcast based on the keyword, information in which the user is interested can be provided without providing unnecessary information to the user. More particularly, information from media information including a television broadcast selected by the user represents information, timely news and so froth in which the user is consciously or unconsciously interested best. Therefore, the information from such media information allows provision of information in which the user is interested.

According to another aspect of the present invention, there is provided an information providing apparatus for causing a representation section of an electric equipment to represent a character to provide information to a user of the electric equipment through the character, comprising connection means for establishing a connection to another electric equipment to transmit or receive character data indicative of the character, and a character system for processing the character data, the character system processing the character data based on character representation data for providing the character with a predetermined representation, and the representation section providing information from the character to the user.

According to a further aspect of the present invention, there is provided an information providing method for allowing character data to be transmitted or received between a plurality of electric equipments connected to each other, comprising the steps of transmitting or receiving the character data to or from one of the electric equipments to or from another one of the electric equipments making use of connection means for connecting the electric equipments to each other, processing the character data based on character representation data for providing the character with a predetermined representation by a character system of the electric equipment for processing the character data, and providing information to a user of the electric equipment through the character making use of representation means of the electric equipment.

With the information providing system, information providing apparatus and information providing method, a character, that is, an electronic pet as an imaginary living body, moves between and appears on any of a plurality of electronic equipments and represents information in the form of an image or sound, which can be recognized by the sense of sight or the sense of hearing of a user of the information providing system, to allow frequent communication between the user and the character. Further, the character can freely move between a plurality of different electric equipments owned by the user such that it can represent the information in the form of a display or generated sound on a designed one of the electric equipments. Further, information of a connection state of the electric equipments and information of each of the electric equipments can be represented in various manners of representation to inform the user of the information when the user tries to use some other electric equipment or disconnect the power supply to some of the electric equipments.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a diagrammatic view illustrating an example of a memory map;

FIG. 7 is a flow chart illustrating an example of a processing procedure upon startup;

DETAILED DESCRIPTION OF THE PREFERRED EMBODIMENT

Figure 1:
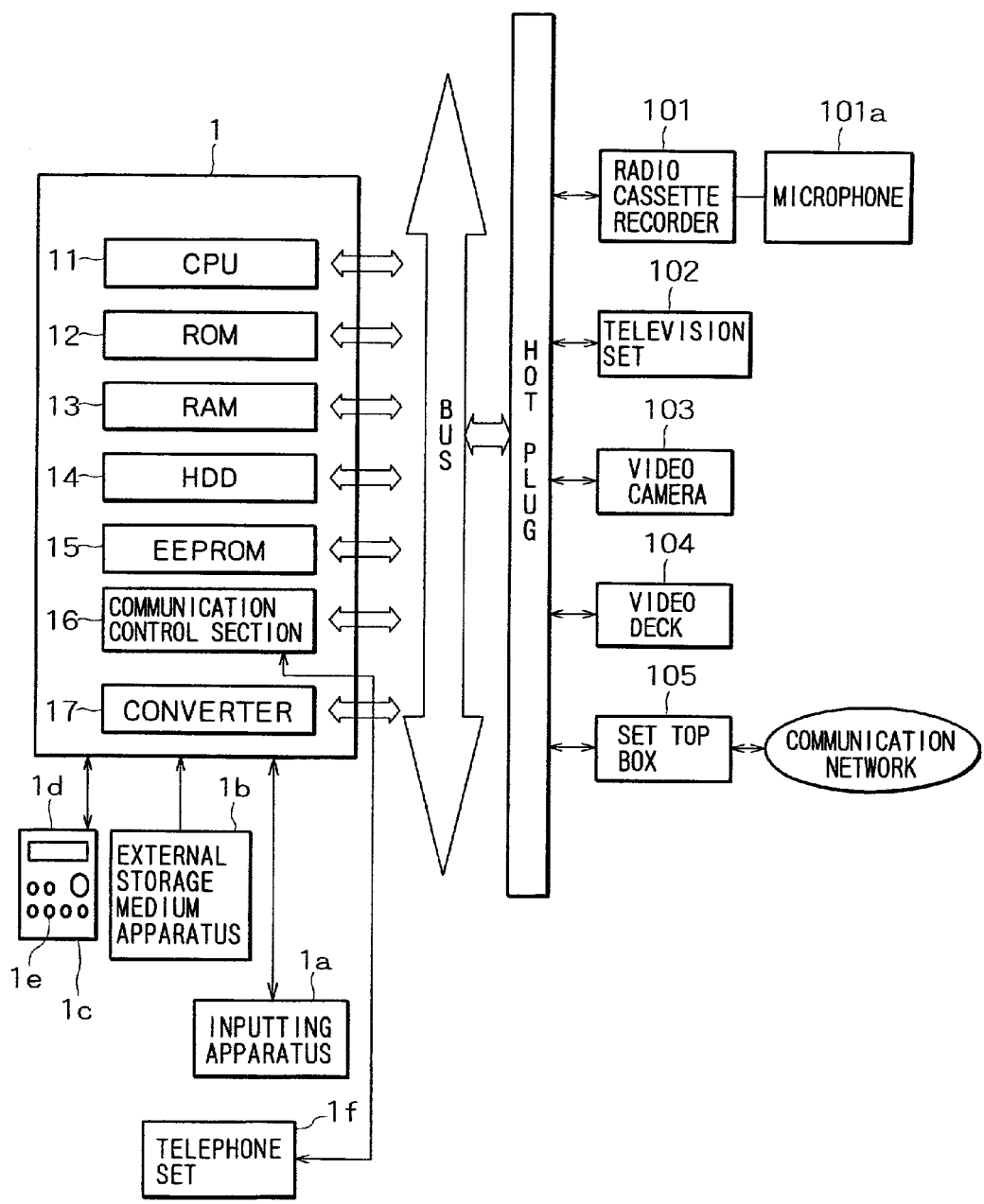
FIG. 1 is a block diagram showing an example of a hardware configuration of an information providing system to which the present invention is applied and which includes an information providing apparatus to which the present invention is applied.

Referring first to FIGS. 1 to 4, there is shown an information providing system to which the present invention is applied and which includes an information providing apparatus to which the present invention is applied. First, an outline of the information providing system is described. The information providing system uses a character, which may be an electronic pet as an imaginary living body, as a communication tool with a user to provide various services to the user. In particular, the information providing system makes it possible "for a character to move between a plurality of equipments connected to each other through a hot plug to communicate with the user", "for an equipment, which is not connected to an outputting equipment through a hot plug, to output information to a different equipment without carrying the outputting equipment itself by storing character data onto a recording medium so that character data can be outputted to the different equipment thereby to allow the character to communicate with the user", "for a plurality of equipments connected to each other through a hot plug to display operation states of the equipment and information of the equipment with each other through the character" and "for an electric equipment, which includes a display apparatus, to represent the character in an overlapping relationship with a video or the like on the display apparatus, or for an electric equipment which includes recording means, to record the character data together with a video".

Further, the communication between the user and the character in the information providing system includes "to cause the character to appear on a representation section or the like of an equipment and provide information to the user", "to cause the character to talk with the user to collect user information", "to provide useful information to the user based on the collected user information" and "to cause the character to exchange information with another character".

In this manner, the information providing system of the present embodiment represents a character based on a plotting system or a sound generation system to allow communication between the user and the character and includes, as a principal component thereof, an agent program which allows such character representation. Further, the information providing system includes a user profile and stores answers from the user to questions asked from the character, inputted items in an input form when the information providing system is connected to a WEB and other information as user information into a storage apparatus such as, for example, a hard disk drive (HDD) or a programmable read-only memory (PROM).

It is to be noted that the information used in the description of the present embodiment includes not only information obtained through a dialogue with the character and information of equipments connected to each other but also information obtained in the form of digital data from a satellite broadcast (BS), satellite communication (CS), ground waves, a cable television network, the Internet or a television telephone connected to an ISDN or the Internet. Such data can be utilized by various equipments with or without the intervention of a computer.

First, a hardware configuration of an information providing apparatus is described. FIG. 1 shows an example of a hardware configuration of an information providing apparatus employed in an information providing system to which the present invention is applied together with other equipments connected to the information providing apparatus. Though not shown, a plurality of such information providing systems each having a similar configuration may be provided. Referring to FIG. 1, the information providing apparatus 1 shown includes, as hardware components, a central processing unit (CPU) 11 serving as a data arithmetic operation and control processing apparatus, a read-only memory (ROM) 12, a random-access memory (RAM) 13, a hard disk drive (HDD) 14 and an electrically erasable programmable read-only memory (EEPROM) 15 which each serves as a storage apparatus, a communication control section 16, and a converter 17 for digitizing voice information.

The CPU 11 executes various processes in accordance with a program stored in the ROM 12 or the HDD 14. Data necessary for the CPU 11 to execute various processes are suitably stored into the RAM 13. Data which must be kept stored also after the power supply to the information providing apparatus 1 is disconnected, such as a user profile and so forth, are stored in the EEPROM 15.

The information providing apparatus 1 may additionally includes an inputting apparatus 1a such as a keyboard. The inputting apparatus 1a may be used to input information such as a user profile which is stored into the information providing apparatus 1 in advance. It is to be noted that inputting operation to the information providing apparatus 1 can be performed also from another equipment connected to the information providing apparatus 1 and therefore the inputting apparatus 1a need not necessarily be provided for the information providing apparatus 1.

The information providing apparatus 1 of the information providing system may additionally include an external storage medium apparatus 1b. The storage medium apparatus 1b may drive an external hard disk, a magneto-optical disk, a CD-R (compact Disk Recordable), a DVD (Digital Versatile Disk) or a Memory Stick and can store data stored in the information providing apparatus 1 and read out such stored data.

Further, the information providing apparatus 1 of the information providing system may additionally include a special storage apparatus 1c which in turn a representation section 1d for generating a character and an inputting section 1e. In this instance, program data of the character described hereinabove and so forth may be copied or moved into the special storage apparatus 1c. If such program data are copied into the special storage apparatus 1c, then only information which has, for example, a newer time code is stored and provided to the information providing apparatus 1. On the other hand, if such program data are moved into the special storage apparatus 1c, then the information providing apparatus 1 may display that the character is "absent". Further, since the special storage apparatus 1c includes the representation section id which can represent the character, for example, by voice or a display of a pattern or the like, the user can communicate with the character while carrying the special storage apparatus 1c.

Accordingly, if the special storage apparatus 1c is used and connected to an equipment which is not connected to the information providing apparatus 1 through a hot plug, then the character having the latest information is allowed to appear on the equipment.

Various electric equipments such as an AV equipment and various home appliances are connected to the information providing apparatus 1 for use with the information providing system through a hot plug which can transfer data. Such AV equipments and home appliances include a television set, a video deck, a portable camera, a digital video camera, a digital camera, a stereo set, a radio set, a portable or installed personal computer, a facsimile apparatus, an information terminal including a portable telephone set, a set top box, a printer, a navigation system, another OA equipment, and other home appliances such as an illumination apparatus, a refrigerator, a washing machine, and an electric rice-cooker.

The information providing system of the present embodiment causes any of the equipment to represent (in the form of voice or an image) a character (electronic pet as an imaginary living body) on its representation section (such as, for example, a screen of a television set, a speaker of a radio set or an audio equipment) to allow the user to enjoy conversation with the character or collect information of the user through communication with the user, select information conforming with needs of the user from an information source or sources connected through a hot plug (such as a television set, a radio set, an information terminal or home appliances) and provide the information to the user.

For example, if a home appliance is taken as an example of an information source, when washing of a washing machine approaches an end, the information providing apparatus 1 acquires the remaining timer time of the washing machine and represents such voice or characters as "The washing will come to an end in one minute" on an electric equipment such as a television set. Further, where the electric equipment is a video recorder or a digital camera, the character is displayed in an overlapping relationship with an object being picked up by the video recorder or digital camera. In particular, the information providing apparatus 1 executes preferential image processing in order to always assure a display area for character data so that the character may be represented in front of an image displayed by the video recorder or digital camera.

Therefore, since the state wherein the character is represented is graphically processed preferentially, the character is recorded onto a recording medium such as a video tape, a DVD, a Memory Stick or a RAM together with an image displayed by the video recorder or digital camera. In this manner, the character can be imaged together with an image pickup object or a display image by a video recorder, a digital camera or the like.

In this manner, one of the equipments includes a representation section such as a screen or a sound generation section, and inputting means for allowing communication with the character. The representation section may be a screen of a television set, a display section of a video camera or a digital camera, a liquid crystal display section or a speaker of a radio cassette recorder. However, a home appliance which usually has no representation section such as a refrigerator or a cleaner may additionally include a representation section so that the character may be represented on the appliance.

The inputting means may be the inputting apparatus 1a provided directly for the information providing apparatus 1, a keyboard or a mouse of a personal computer, a remote controller for a television set, a video deck or the like, a controller of a game machine or a panel which may be provided on various equipments.

Where a remote controller is used as the inputting means, the information providing apparatus 1 causes an upwardly and downwardly directed arrow mark button or buttons such as, for example, a volume adjustment button to be displayed so that an answer may be inputted by operation of the button or buttons in response to a question which can be answered with "Yes/No" or which can be answered through selection from several choices.

Further, where a remote controller is used as the inputting means, if a word need be inputted, then the information providing apparatus 1 preferably causes, where the representation section is a display apparatus such as a screen of a television set, the display apparatus to display alphabetical letters such that suitable characters may be successively selected using a volume adjustment button or the like on the remote controller to input a word or words. Alternatively, a word or words may be inputted by voice through a microphone provided for a radio cassette recorder or the like and then converted into characters making use of a voice recognition process. Such countermeasures as described above allow characters to be inputted without the provision of a keyboard.

The converter 17 has a known configuration and converts voice information into digital data to allow recognition of contents of a television broadcast or a radio broadcast and information inputted in the form of voice.

Figure 2:
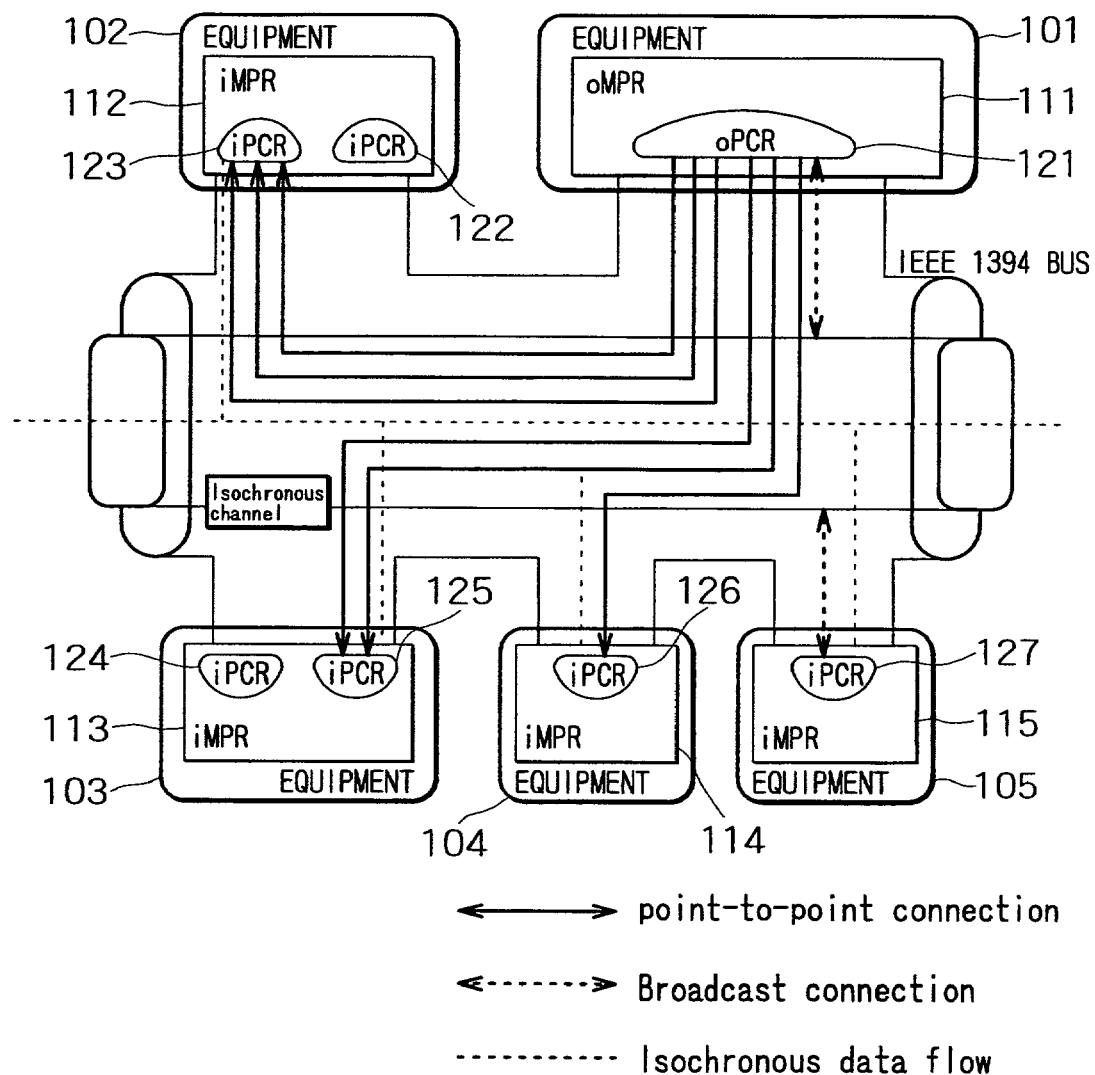
FIG. 2 is a flow diagram showing an example of a configuration and connection of a network which uses a high speed serial bus complying with the IEEE 1394 standards as an example of a hot plug.
Figure 3:
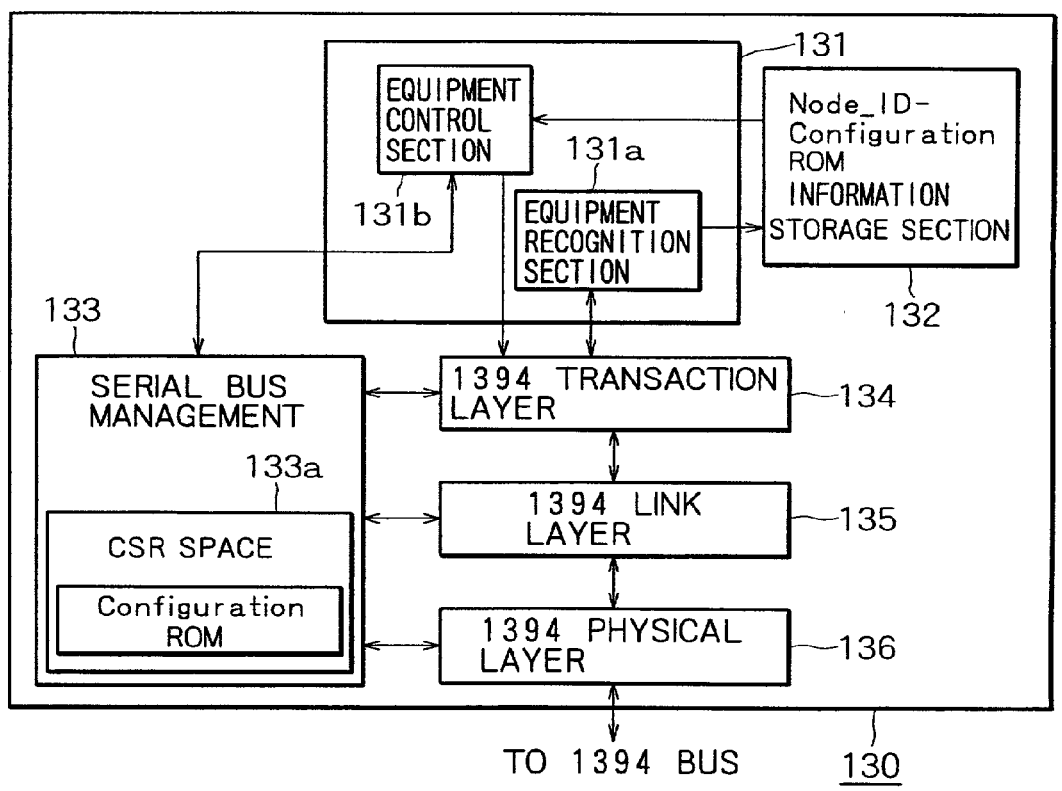
FIG. 3 is a block diagram illustrating control of a plurality of electric equipments through an IEEE 1394 high speed serial bus as an example of a hot plug.
Figure 4:
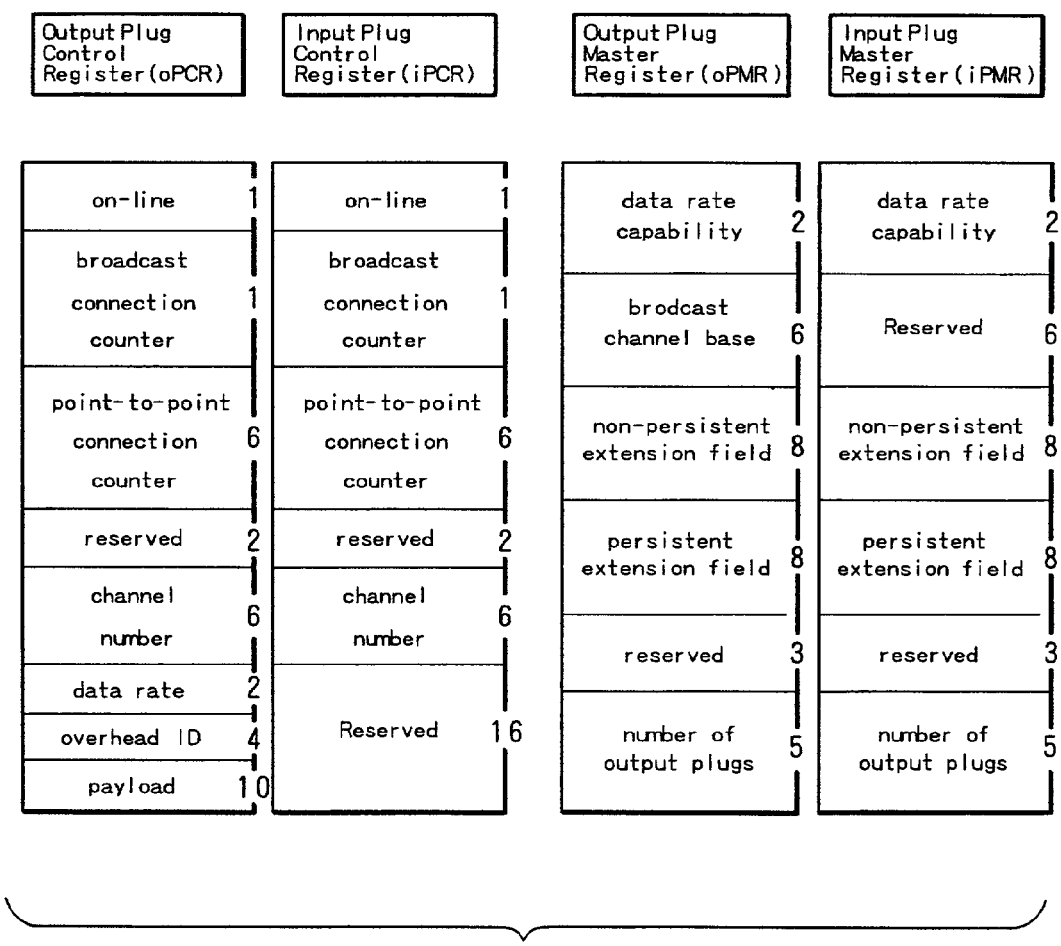
FIG. 4 is a diagrammatic view showing a spatial structure of a command and status register (CSR) and a structure of a configuration read-only memory (ROM)

The information providing apparatus 1 uses, as a hot plug which allows data transfer, a hot plug which allows mutual connection between different equipments. As an example of the hot plug, the i-Link compliant with the USB or IEEE 1394 standards is known. In FIGS. 2 to 4, the information providing apparatus 1 uses a hot plug compliant with the IEEE 1394 standards. According to the connection scheme, for example, isochronous transfer is used. The isochronous transfer is a technology suitable to play back data while the data are received so that image display of image data or sound generation of voice data may not be stopped during playback, and does not necessarily require a computer such as a personal computer.

Through the use of the connection scheme, digital audio and video apparatus such as an installed video deck, a television set, a stereo set, a digital CATV receiver, a digital satellite broadcast receiver and an Internet terminal and various equipments including home appliances such as a television telephone set, an illumination system, an air conditioner, an electric rice-cooker and a washing machine can be connected to the information providing apparatus 1 so that the user may effect on-off control of various power supplies for such home appliances as the illumination system, air conditioner, microwave oven, electric rice-cooker or washing machine or a key for the home security or confirm states of various equipments through the information providing apparatus 1 from the user's destination when the user goes out in accordance with scheduled time at which the user may come home.

The connection between the information providing apparatus and various equipments or between various equipments may be any of a "daisy chain" connection similar to a bus connection used for connection of a network, a connection similar to a star connection and a connection wherein many lines extend from one place. The information providing apparatus 1 uses the "daisy chain" connection. In particular, a basic box has sockets for a plurality of connection terminals (connectors) formed thereon. The sockets are for 6-pin connectors.

Generally, connectors are divided into 6-pin connectors and 4-pin connectors, and where power supply is required, a 6-pin connector is used. A connector on the cable side is configured so as to prevent a connection error between positive and negative pins and between male and female pins. On the other hand, a connector on the equipment side is free from a concept of distinction between an input terminal and an output terminal, and where the hot plug has a plurality of sockets, it may be connected to any of the sockets. Further, the 6-pin connector has a locking mechanism as an optional mechanism so that the connector may not be removed inadvertently.

Particularly, an IEEE 1394 high speed serial bus is used for such connection of digital audio and video apparatus as an installed video deck, a television set, a stereo set, a digital CATV receiver, a digital satellite broadcast receiver and an Internet terminal and various equipments including home appliances such as a television telephone set, an illumination system, an air conditioner, an electric rice-cooker and a washing machine so that the user may effect on-off control of various power supplies to such home appliances as the illumination system, air conditioner, electric rice-cooker or washing machine or a key for the home security or confirmation of states of various equipments through the Internet from the user's destination when the user goes out in accordance with scheduled time at which the user may come home as described above or for transfer of a main signal or a control signal between video equipments or audio equipments such as a digital video camera. A network can be formed by connection of a plurality electric equipments (hereinafter referred to as "1394 equipment") in which the IEEE 1394 serial bus interface is incorporated.

A system wherein an IEEE 1394 high speed serial bus is used to form a network of several equipments is shown in FIG. 2. In FIG. 2, an electric equipment shown is formed as an AV equipment for the convenience of description. Referring to FIG. 2, five different equipments 101 to 105 are connected to the IEEE 1394 high speed serial bus. Each of the equipment 101 to 105 includes a master plug register (MPR) and a plug control register (PCR) prescribed by the IEC 61883 standards ("Digital interface for consumer electronic audio/video equipment", IEC, Reference number 100C/46 to 50/CDV, project number 100C/61883-1 to 5/Ed.1) in order to establish a relation of an isochronous channel upon data transfer between different equipments. The registers are divided into input registers and output registers for various equipment data. In particular, the master plug registers are divided into an input master plug register (iMPR) and an output master plug register (oMPR), and the plug control registers are divided into an input plug control register (iPCR) and an output plug control register (oPCR). Details of the registers are prescribed by the IEEE 1394 standards as seen in FIG. 4.

Each of the equipments 101 to 105 includes only one of oMPR 111 and iMPRs 112 to 115 and manages the number of oPCRs and iPCRs such as oPCR 121 and iPCRs 122 to 127. The maximum number of oPCRs or iPCRs which can be included in one equipment is 32. Each of the oPCRs and iPCRs describes whether or not a broadcast connection is involved, the number of point-to-point connections, the isochronous channel number and so forth, and each of the oPCRs further describes the transfer rate and the bandwidth of an isochronous data flow.

Register addresses in which the MPRs and the PCRs are described are described in addresses from FF FF F0 09 00 h (h represents a hexadecimal notation) to FF FF F0 09 FF h in the CSR (Command and Status Register) prescribed by the IEEE 1394 standards.

Isochronous data outputted from each equipment can be transferred to any other equipment because a path for an isochronous data flow can be established between different equipments by suitably setting the PCRs. Connections which use the PCRs are divided into two types including a point-to-point connection and a broadcast connection.

The point-to-point connection connects an oPCR of a certain equipment to an iPCR of another equipment by an isochronous channel. For example, in FIG. 2, the point-to-point connection corresponds to a data flow between the oPCR 121 of the equipment 101 and the iPCR 126 of the equipment 104. This connection is protected because the pertaining registers can be rewritten only by an equipment by which the connection is established or by a control application. A plurality of point-to-point connections may be included in one PCR. This corresponds, for example, to three point-to-point connections for which the same isochronous data flow between the oPCR 121 of the equipment 101 and the iPCR 123 of the equipment 102 is used.

The broadcast connections are divided into two types including a broadcast-out connection which connects only an oPCR of a certain equipment and an isochronous channel and a broadcast-in connection which connects an iPCR of another equipment and an isochronous channel. For example, the broadcast-out connection connects the oPCR 121 of the equipment 101 and a broadcast channel number (usually set to 63) for isochronous data, and the broadcast-in connection connects the iPCR 127 of the equipment 105 and the broadcast channel number for isochronous data. In the two broadcast connections, the sending party and the receiving party are set independently of each other without relying upon the state of the other party. Further, since the PCRs can be rewritten from any other equipment than the equipment or a control application by which the broadcast connection is established, not only the connection can be cut, but also a broadcast isochronous channel from an equipment in a transmitting state can be stolen.

According to the 1394 protocol, each equipment connected to the IEEE 1394 high speed serial bus is informed of the Node_ID number and the maximum operating speed of the other 1394 equipment by a Self-ID process upon bus initialization.

Referring now to FIG. 3, an IEEE 1394 equipment control apparatus is shown in block diagram. The IEEE 1394 equipment control apparatus 130 shown includes a connection control section 131, a Node_ID-Configuration ROM information storage section 132, a serial bus management 133, a 1394 transaction layer 134, a 1394 link layer 135, and a 1394 physical layer 136.

The connection control section 131 includes an equipment recognition section 131a and an equipment control section 131b. A signal from the equipment recognition section 131a is signaled through the 1394 transaction layer 134, 1394 link layer 135 and 1394 physical layer 136 to an IEEE 1394 high speed serial bus at an appropriate timing after assembled into a packet. Conversely, a signal from the IEEE 1394 high speed serial bus is sent to the equipment recognition section 131a through the 1394 physical layer 136, 1394 link layer 135 and 1394 transaction layer 134. The equipment recognition section 131a stores necessary information into the Node_ID-Configuration ROM information storage section 132.

A signal from the equipment control section 131b is signaled to the IEEE 1394 high speed serial bus along a path similar to that of the flow of a signal from the equipment recognition section 131a described above. However, the Node_ID-Configuration ROM information storage section 132 is referred to in order to designate a destination of the signal.

The serial bus management 133 controls the 1394 transaction layer 134, 1394 link layer 135 and 1394 physical layer 136 based on information of a CSR space 133a as prescribed by the IEEE 1394 standards. Meanwhile, the equipment control section 131b transmits information past an address designated in the CSR space 133a in order to transfer a control command to or from another 1394 equipment. The electric equipment in the present embodiment is connected in such a manner as described above.

Figure 5:
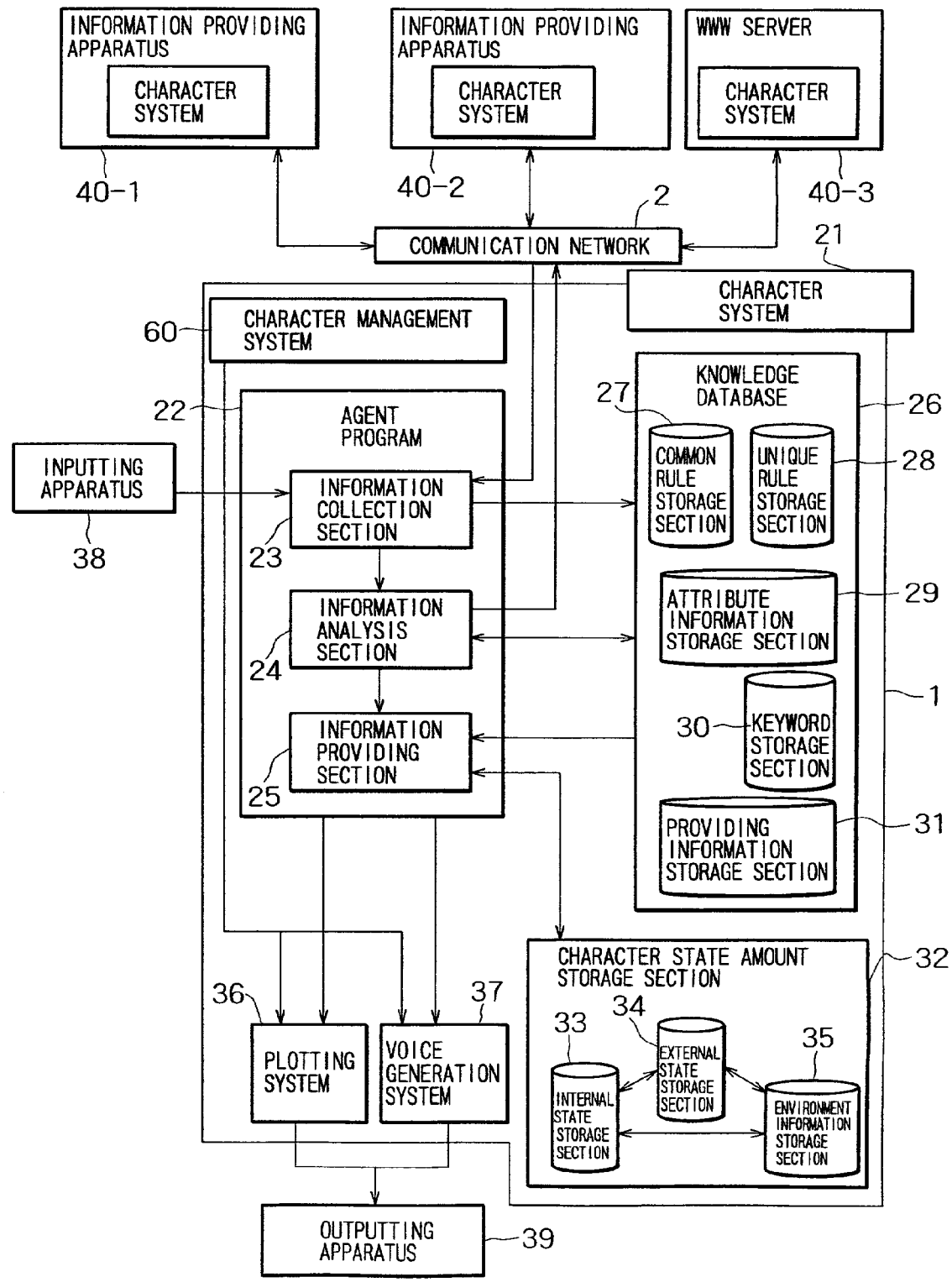
FIG. 5 is a block diagram showing an example of a character system incorporated in the information providing system of FIG. 1.

Now, a system configuration relating to the information providing system of the present embodiment is described. FIG. 5 shows a general configuration of an example of a character system. Referring to FIG. 5, a character system 21 of the information providing apparatus 1 includes an agent program 22 for controlling the will and the action of the character, a knowledge database 26 for storing information regarding the mode of life and knowledge information of the character, a character state amount storage section 32 for supervising an internal state, an external state, an environment and so forth of the character, controlling the will and the action of the character based on data obtained by the supervision and storing a result of control, a plotting system 36 for producing display data of the character, a voice generation system 37 for outputting voice of the character, and a character management system 60.

It is to be noted that reference characters 40-1, 40-2 and 40-3 denote each an external information providing apparatus. Of the external information providing apparatus 40-1, 40-2 and 40-3, the information providing apparatus 40-3 is a WWW server in which a character system is provided. Where an information providing apparatus or apparatuses are provided in this manner, it is possible to store data into a recording medium and exchange information directly to and from an external information providing system and communicate data readily with the external information providing system through a communication network.

The agent program 22 includes an information collection section 23, an information analysis section 24, and an information providing section 25. The information collection section 23 fetches user information or information and so forth selectively collected from such media as a television broadcast, a radio broadcast and so forth for the user. The information fetched by the information collection section 23 is analyzed by the information analysis section 24 and separated into information to be provided to the knowledge database 26, information to be signaled to another character system or the like through a communication network 2 and information to be provided to the information providing section 25. Various kinds of information such as the fetched user information and selected information are stored into a providing information storage section 31 of the knowledge database 26. The agent program 22 thus generates a character which can act autonomously on a display apparatus such as a television screen. It is to be noted that the number of characters to be displayed in one character system is not necessarily limited to one but may be a plural number.

It is to be noted that, in the information providing apparatus 1 of the present embodiment, the agent program 22 is stored on the HDD 14 and is constructed so as to normally fetch supervision program data into the RAM 13 and execute arithmetic operation processing as a normal supervision program together with the CPU 11.

Accordingly, even when the character is not displayed on a display apparatus such as a television screen, that is, even when the agent program is not being executed, an execution history of the user can always be acquired as log data.

The information analysis section 24 analyses the liking or taste of the user and produces a keyword on the basis of the user information. In particular, the information analysis section 24 fetches the program data of the agent program stored on the HDD 14 and user information into the RAM 13 in advance and cooperates with the CPU 11 to perform arithmetic operation processing to analyze the taste of the user and produce a keyword. The keyword is stored into a keyword storage section 30 which is hereinafter described.

The keyword is read into the RAM 13 and is used for arithmetic operation processing between the CPU 11 and the RAM 13. Consequently, the character can autonomously search out topics regarding timely topics conforming with the taste of the user from such media as a television broadcast and a radio broadcast and provide the searched out topics to the user. For example, the character can provide weather forecast information upon connection, traffic jam information, news relating to current events, news relating to public entertainments, newly released music information and so forth.

It is to be noted that, while the character can autonomously provide information as described above, if the user designates the time and a search channel, then the user can acquire information regarding details designated by the user. For example, if the user is anxious about a result of a baseball game broadcast in another channel while the user enjoys a drama on a television receiver, then the user designates the channel in which the baseball game is broadcast and a time zone of the baseball broadcast.

Then, the user gives such a message as "Please tell me a result of the game" to the character. The information collection section 23 thus picks up information of a result of the game using "keywords relating to a result of the game" such as "win", "lose", "walk-off" and "X to X" and notifies the user of the information. In this instance, the character appears in a corner of a screen on which the drama is broadcast and displays a message such as "The A team won with the score of 1 to 0" or "The game was walk-off".

Otherwise, the user may designate so that top news may be reported from within a news program. For example, such a message as "I hear that 'An earthquake occurred in the Kanto district today'." is displayed as a message of a character after contents regarding the greeting and the weather are excepted by a search based on a keyword from contents spoken by an announcer in the beginning of the news program. Such conversations as mentioned above are performed by the character management system 60 provided in the character system 21 which is hereinafter described.

The information providing section 25 selects information for the user, determines a will or an action of the character based on instinct, knowledge and so forth of the character stored in the computer, and provides information to the user.

In particular, when a television set or a radio set connected to the information providing apparatus 1 through a hot plug is on, the information providing section 25 uses a keyword or keywords produced in such a manner as described above to search for information which is necessitated with a high degree of possibility by the user and provides resulting information to the user.

Here, the information providing section 25 determines with reference to a common rule storage section 27 of the knowledge database 26, which is described below, in what expression the character should present information or in what costume the character should present information.

The information providing mode of the character determined by the information providing section 25 is sent to the character state amount storage section 32, which is described below, and used to update internal data of the character state amount storage section 32.

Further, the information providing mode determined by the information providing section 25 is inputted to the plotting system 36 and the voice generation system 37 which are hereinafter described so that a video and voice relating to a behavior of the character are produced by the plotting system 36 and voice generation system 37 based on the information providing mode determined by the information providing section 25. It is to be noted that, where no display apparatus is used, only voice may be outputted.

The knowledge database 26 is stored in a storage apparatus such as the HDD 14 in advance. The knowledge database 26 has stored therein data regarding the mode of life such as in what situation and in what manner the character behaves or what voice (language) is generated (spoken), attribute information of the user, various keyword data, and data regarding information to be provided to the user.

As seen in FIG. 5, the knowledge database 26 includes the common rule storage section 27, a unique rule storage section 28, an attribute information storage section 29, the keyword storage section 30, and the providing information storage section 31.

The knowledge database 26 is read into the RAM 13 upon startup of the agent program 22 and used in arithmetic operation processing by the CPU 11. Consequently, for example, on a display apparatus, the character is displayed as an animation moving image which moves or changes its expression and has a chat with the user such as autonomous conversation or questioning. Where no display apparatus is involved, such conversion or questioning may be performed by voice from a speaker or the like.

When the character chats, either the character continues to chat one-sidedly or asks a question requesting an answer from the user. As a case wherein the character may continue to chat one-sidedly, for example, upon startup of the character system, a message such as "Hello" or "It may rain today. How about carrying an umbrella?" is displayed.

Contents of the messages include news at present, in the near future or in the past and so forth and are produced based on information stored in advance in the providing information storage section 31 and information acquired from several media such as a television broadcast and a radio broadcast as described above.

Further, when the character asks a question to which the user is requested to give an answer, such a question as "Do your like sports?" or "Do you like baseball?" and the user will arbitrarily answer to the question. The answer from the user to the question of the character is stored as user information into the attribute information storage section 29 as hereinafter described.

The common rule storage section 27 stores common data which correspond to the instinct of the character. For example, data for setting the expression of the character, a moving manner of the body, utterance, and a reaction to a movement of the user or the electric equipment are stored in the common rule storage section 27.

The common rule storage section 27 has a memory map 27a produced with regard to data for determination of the displaying mode of the character. The memory map 27a is formed such that "action", "representation", "expression" and so forth are registered at predetermined addresses of a user use area of the common rule storage section 27 as seen in FIG. 6. Pertaining data are read out from addresses of the memory map 27a in which the data are recorded and used to represent various modes of different categories such as the expression of the character, the costume of the character, the moving manner of the body, the utterance and the reaction.

For example, as regards the expression of the character, data of a smiling face as expression 1, an angry face as expression 2, a sad face as expression 3, a peaceful face as expression 4, an impressed face as expression 5, a face which does not express a particular feeling as expression 6 and so forth are stored.

As regards the costume of the character, data for displaying the character in a state wherein the character has an umbrella as representation 1, another state wherein the character wears sun glasses as representation 2, a further state wherein the character has a headphone put on the head thereof as representation 3, a still further state wherein the character wears a uniform as representation 4, a yet further state wherein the character is taking a meal as representation 5, a yet further state wherein the character uses a personal computer as representation 6, and various other states are stored.

As regards the action of the character, data for displaying the character in a state wherein the character stands as operation 1, another state wherein the character is dancing as operation 2, a further state wherein the character is thinking with its arms folded as operation 3, a still further state wherein the character is walking around as operation 4, a yet further state wherein the character is skipping as operation 5 and other various operations are stored.

When information is provided from the character to the user, the data of the memory map 27a are selected every time so that the form of the character may be suitable for the information to be provided.

For example, the expression of the character is determined for predetermined words. For example, for such words as "fine", "celebrate", "achieve" and "bright", the data of the memory map 27a are set so that the character may have a bright expression or act positively. On the contrary, for such words as "rain", "accident", "puzzled" or "terrible", the data of the memory map 27a are set so that the character may have a gloomy expression or act negatively. It is to be noted that, where the representation section is not a display but utterance from a speaker, a message may be given together with bright music, gloomy music, imitative sound of rain or the like.

The unique rule storage section 28 stores rules unique to the user in accordance with which the character system is to be operated. For example, as such rules, the frequency in which the character should appear on a screen, the frequency in which a question is to be asked to the user, the number of characters to be displayed by the character system, the kind of voice of each character, the type of each character (for example, a spaceman, an animal, a plant, a robot or the like) and so forth are set.

The unique rule storage section 28 further stores data regarding, for example, whether or not a "balloon" should be displayed when the character chats, the speed at which characters are displayed when a balloon should be displayed, what language is used as a display language or a language for inputting, whether voice should be outputted in a stereo mode or a monaural mode, and so forth. Such data are set individually so that the user can use them conveniently.

The attribute information storage section 29 stores a user profile as attribute information of the user. The user profile may include the birthday of the user, the family make-up, family members' birthdays, tastes and life styles of the members of the family and so forth.

The attribute information storage section 29 stores, in addition to the user profile, an answer to a question from the character, input data inputted in an input form to a questionnaire when the character system is connected to the Internet or the like, and so forth. The information collection section 23 collects such inputted information and successively stores the information into the attribute information storage section 29. The capacity of the attribute information storage section 29 for information to be stored is set to a predetermined size in advance, and if the preset capacity should be exceeded, then the latest information is stored preferentially into the attribute information storage section 29 while the oldest information in date is deleted by overflow.

It is to be noted that, since the user profile is less likely to be changed, it may be protected so as not to be deleted.

Storage into the unique rule storage section 28 and registration of a user profile into the attribute information storage section 29 are performed upon installation of the program or initialization which is performed when the program is started up for the first time.

The keyword storage section 30 stores keywords prepared as basic data in advance and keywords produced by the information analysis section 24 of the agent program. It is to be noted that, if the words are stored in a classified form for different categories, then a search with a keyword can be performed efficiently and advantageously. A method of producing a keyword is hereinafter described in detail.

The providing information storage section 31 stores a source of information to be provided to the user. For example, questions to the user, answers to be used for conversation with the user, information for mere chatting, useful information to the life, knowledge in various matters and so forth are stored in the providing information storage section 31. The information stored is used to cause the character to autonomously appear on the computer and ask an answer to the user, display like "In order to make tea well, you had better . . . " or display such a message as "Today is the birthday of President XXX." based on date information acquired from an environment information storage section 35 which is hereinafter described.

Also information selectively collected from such media as a television broadcast and a radio broadcast and information of a connection state of electric equipments suitably for the user by the information collection section 23 of the agent program 22 is stored in the providing information storage section 31.

The character state amount storage section 32 stores states of the character whose state successively changes as time passes or as an event occurs. Of such states, internal parameters (which cannot be discriminated from any other character) such as the feeling, the degree of hungriness and the curiosity of the character are stored in an internal state storage section 33.

Meanwhile, external parameters (which can be discriminated from another character) such as the position, orientation and color of the character are stored in an external state storage section 34. Further, those parameters which indicate a physical environment around the character such as an object other than the character, the weather, the temperature, the gravity, and the date are stored in the environment information storage section 35.

It is to be noted that the information to be stored into the environment information storage section 35 is fetched from connection information of other electric equipments and contents acquired from various mass media such as a television broadcast and a radio broadcast and various sites of the Internet and so forth. The information may include, for example, weather information (rainy, fine, hot, cold or the like), news on current topics (an earthquake has occurred, a serious accident has occurred, or the like), news on public entertainments (that a famous talent has engaged, newly released music information, or the like), and operation states of the other electronic equipments.

Based on the information stored in the internal state storage section 33, the character autonomously appears on the computer and utters like "I'm hungry." or, based on the information stored in the environment information storage section 35, such a message as "I'm gloomy because it rains today." or "The power supply to the XX equipment remains connected." is represented.

Further, based on the information stored in the external state storage section 34, various modes of the character such as the costume or the behavior are displayed. For example, if the information that "It rains today." is acquired from the environment information storage section 35, then the character appears with a raincoat on, and besides, since the information that "the character is gloomy when it rains" is stored in the internal state storage section 33 as described above, the character having a gloomy expression is represented on the display screen or by voice.

Such a display of the character is prepared by the plotting system 36. The plotting system 36 particularly produces display data of a will, an action and so forth of the character determined by the agent program 22 such as to change the expression, change the costume, move the hands and feet or move the mouth in conformity with the conversation.

The voice generation system 37 produces voice data for a conversation or a question based on the will, action and so forth of the character. The data are outputted as output data to the speaker of a television set or the speaker of a stereo set. Further, since the information providing apparatus 1 includes the communication control section 16, it is possible to install an application program for automatically originating a telephone call into the HDD 14 so that the character may originate a telephone call to a portable telephone set or the like of the user and chat by voice with the user.

As described above, the character in the information providing apparatus 1 of the present embodiment autonomously changes itself because the information providing modes such as the will, action and so forth of the character are determined based on given information and a result of the determination is stored as an internal state of the character again and used as information for subsequent determination of the will and action.

Now, basic operations of the character by the agent program are described. FIG. 7 illustrates an example of a processing procedure upon startup. In the process upon startup, when data transfer is performed between the information providing apparatus 1 and a predetermined equipment or between different equipments, the character is transferred together with the data from the system or an equipment to another equipment through a hot plug or a memory card and is represented by the representation section of the latter electric equipment.

When the character is to move actually within the equipment, the agent program 22 which is program data for generating a character is first started up (step S1), as seen in FIG. 7. Then, an internal state of the character (for example, the character is angry, hungry or the like), an external state (for example, the position at which the character is, the orientation in which the character looks, an appearance of the character or the like) and environment information (for example, presence of an object or objects other than the character, the temperature, the direction of the wind or the like) are inputted from the character state amount storage section 32 to the information collection section 23 of the agent program 22 and then the information collection section 23 determines a display mode of the character (step S2). Then, it is discriminated based on an inputting process by the user or the like whether or not the user of the equipment should communicate with the character (step S3).

If the user should communicate with the character in step S3 (step S3; Yes), then the processing advances to a "communication process between the user and the character" (process A). However, if the user should not communicate with the character in step S3 (step S3; No), then the processing is ended.

Figure 8:
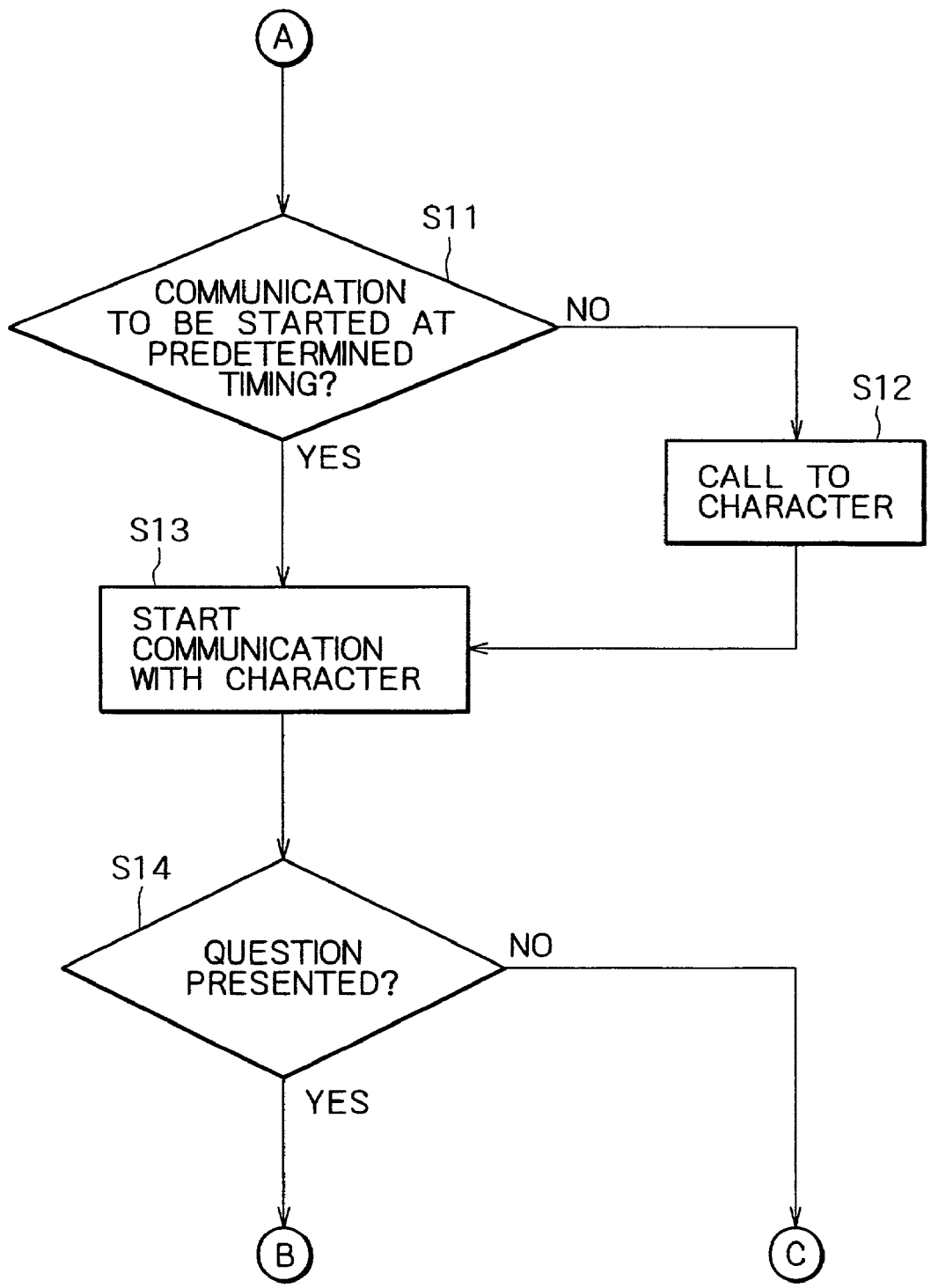
FIG. 8 is a flow chart illustrating an example of a communication procedure with a character.

When the communication process between the user and the character (process A) is to be performed, such processing as illustrated in a flow chart of FIG. 8 is executed. Referring to FIG. 8, the process A illustrated is an example of the communication process between the user and the character, and it is first discriminated whether or not the communication between the user and the character should be started at a predetermined timing (step S11). If the communication between the user and the character should be started at a predetermined timing in step S11 (step S11; Yes), then the processing advances to step S13. In this process, questions and so forth are successively displayed automatically at predetermined timings, and the user inputs answers to the questions and so forth.

On the other hand, if the communication between the user and the character should not be started at a predetermined timing in step S11 (step S11; No), then either the character displayed is clicked using the inputting apparatus or, if a character call button is displayed on representation means (for example, the representation apparatus), then the call button is clicked to call to the character (step S12).

Figure 9:
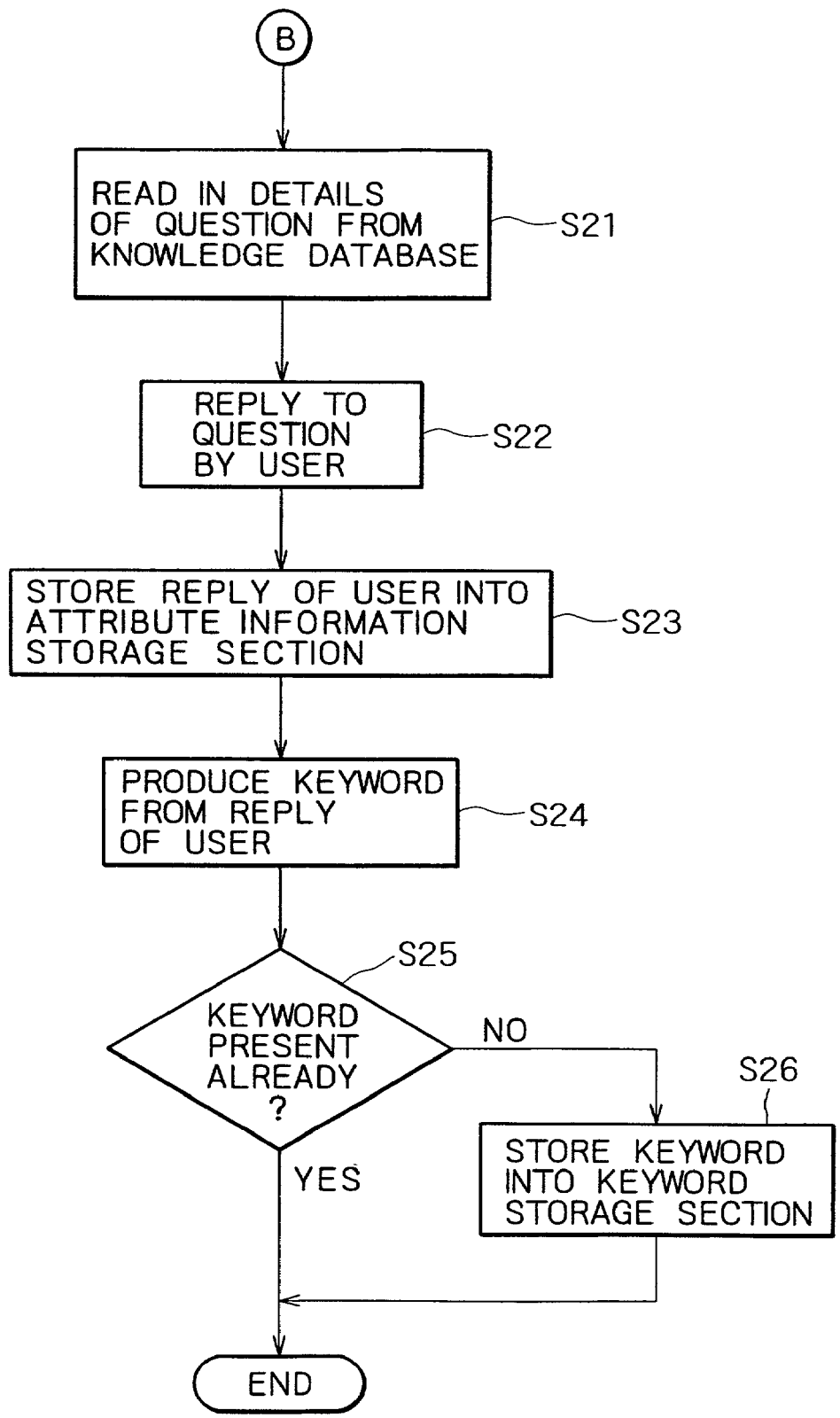
FIG. 9 is a flow chart illustrating an example of a question processing procedure from the character to a user.
Figure 10:
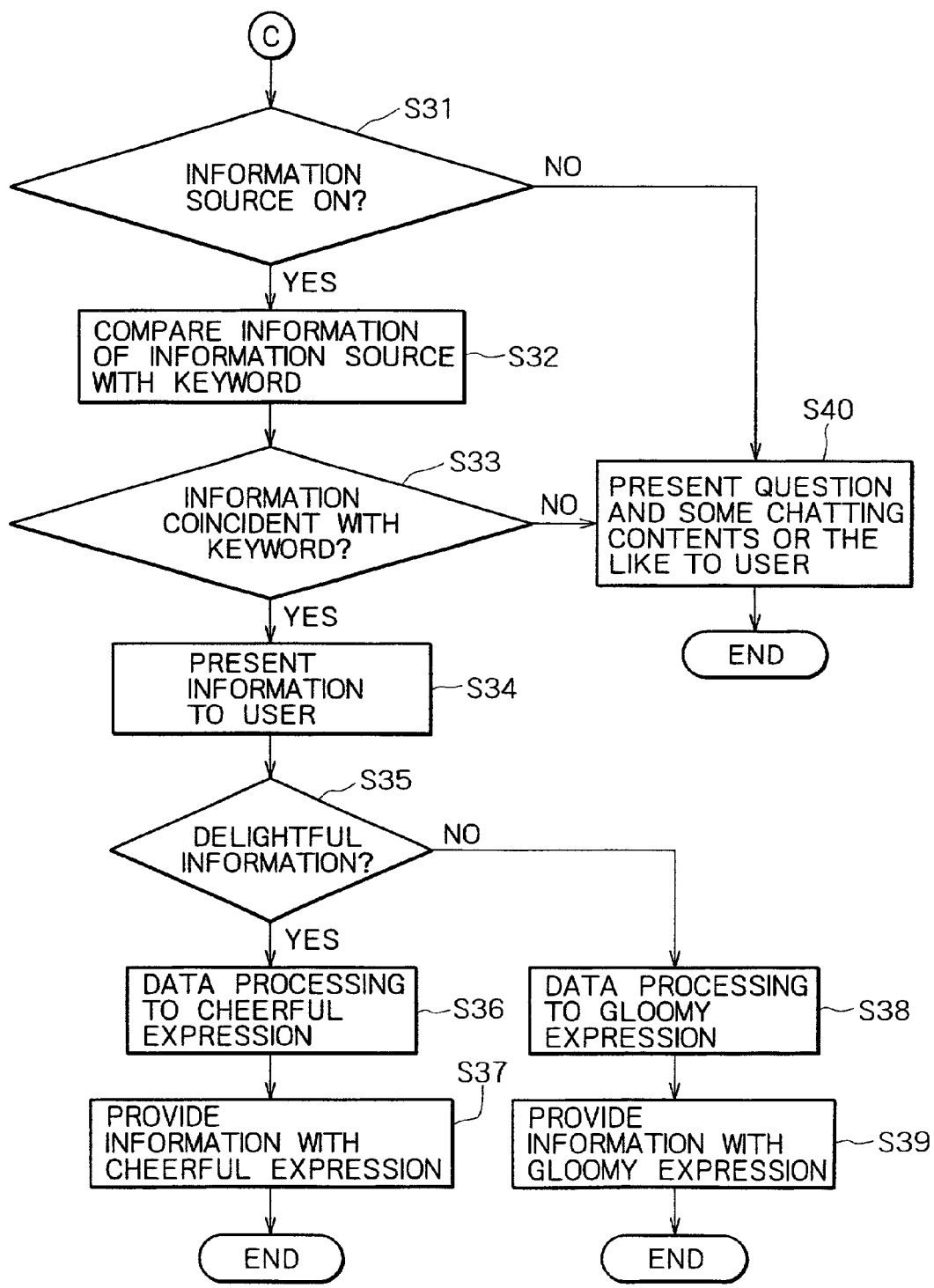
FIG. 10 is a flow chart illustrating an example of an asking procedure from the character to the user.

Then, communication between the character and the user is started (step S13). Then, it is determined whether or not a question should be presented to the user first (step S14). If a question is to be presented to the user in step S14 (step S14; Yes), then the processing advances to a question process B which is illustrated in FIG. 9. On the other hand, if a question is not to be presented to the user in step S14 (step S14; No), then the processing advances to an asking (for example, chatting) process C which is illustrated in FIG. 10.

Now, a questioning process from the character to the user of the process B mentioned above is described. An example of the questioning process from the character to the user is illustrated in FIG. 9. Referring to FIG. 9, when a question is to be presented from the character to the user as discriminated in step S14 of FIG. 8, a predetermined question is first selected from within the providing information storage section 31 of the knowledge database 26 and presented to the user (step S21).

After the question is presented in step S21, the user will answer to the presented question and the answer is inputted (step S22). The answer data of the user in step S22 are stored into the attribute information storage section 29 of the knowledge database 26 (step S23)

Then, the answer of the user in step S22 is analyzed by the information analysis section 24 of the agent program 22 to produce a keyword (step S24). Further, it is discriminated whether or not the produced keyword is already present (step S25).

If the keyword is already present in step S25 (step S25; Yes), then the processing is ended. On the other hand, if the keyword is not present in step S25 (step S25; No), then the keyword is stored into the keyword storage section 30 of the knowledge database 26 (step S26), whereafter the processing is ended.

Now, a calling (chatting) process from the character to the user of the process C is described. It is to be noted that, while the representation in the following description is a display, it may alternatively or additionally include representation by voice as described hereinabove.

FIG. 10 illustrates an example of a calling process from the character to the user. Referring to FIG. 10, when chatting from the character to the user is to be performed as discriminated in step S14 of FIG. 8, it is first discriminated whether or not an information source such as a television set or a radio set is ON (step S31). If an information source is ON in step S31 (step S31; Yes), then the keyword read out from the keyword storage section 30 of the knowledge database 26 is compared with information outputted from the information source such as a television set or a radio set at the point of time (step S32).

Then, it is discriminated whether or not a result of the comparison in step S32 indicates that information coincident with the keyword is present (step S33). If coincident information is present in step S33 (step S33; Yes), then the information is presented to the user (step S34).

Then, it is discriminated by the information providing section 25 that the presented information is delightful information (step S35). This discrimination is performed, for example, making use of data of "delightful" or "gloomy" stored in a corresponding relationship to a keyword which coincides with the pertaining information based on the keyword. If the presented information is delightful information in step S35 (step S35; Yes), then data indicative of a bright expression is selected from within the memory map 27a and a cheerful expression data process is performed (step S36). Then, the character provides the information with a cheerful expression (step S37).

On the other hand, if the discrimination in step S35 represents that the information to be presented has gloomy contents (not delightful information) (step S35; No), then data indicative of a gloomy expression are selected from within the memory map 27a and a gloomy expression data process is executed (step S38). Then, the character provides the information with a gloomy expression (step S39).

It is to be noted that, while the description above relates only to the expression of the character, also the costume of the character is changed suitably in conformity with the contents of the information in a similar manner as in the process described above. Also where the character provides information by sound without using a display, delightful music (sound) or gloomy music (sound) is used by a similar process to that described above. Such sound and so forth may be registered in internal data of the character state amount storage section 32 in advance or selectively used from within information collected from external media and so forth.

On the other hand, if no information source is ON in step S31 (step S31; No) or if information coincident with the keyword is not detected in step S33 (step S33; No), then the information providing section 25 reads the providing information storage section 31 of the knowledge database 26 and presents a question, some chatting contents, a useful hint to the daily life or the like to the user (step S40). Thereafter, the processing is ended.

It is to be noted that, in the process described above, it is discriminated in step S35 that the information to be provided is delightful information and the expression of the character is changed based on the discrimination. However, the process may be modified in the following manner. In particular, when the discrimination in step S35 indicates that the information to be presented is delightful information, it is discriminated whether or not the current expression of the character displayed at present is a delightful expression, and if the character currently has a delightful expression, then the character provides the information with the delightful expression maintained. However, when the current expression of the character is not a delightful expression, then the internal data of the character state amount storage section 32 are updated with those data read out from the memory map 27a of the common rule storage section 27 and representative of a delightful expression so that the expression of the character is changed from the gloomy expression to the delightful expression and the character provides the information with the delightful expression.

Similarly, when the discrimination in step S35 indicates that the information to be presented is not delightful information, it is discriminated whether or not the expression of the character at present is a gloomy expression. Then, if the current expression of the character is a gloomy expression, then the character provides the information with the gloomy expression thereof maintained. However, if the expression of the character at present is a delightful expression, then the internal data of the character state amount storage section 32 are updated with those data read out from the memory map 27a of the common rule storage section 27 and representative of a gloomy expression so that the expression of the character is changed from the delightful expression to the gloomy expression and the character provides the information with the gloomy expression.

According to the alternative configuration described above, the expression of the character is changed in response to contents of information to be presented. The character may have any of various expressions including, in addition to a delightful expression and a gloomy expression described above, a softened expression, an impressed expression and lack of expression, and in response to contents of the information to be presented, one of the expressions most conforming with the contents is selected. When various contents of information are to be successively provided, the expression of the character may be changed successively depending upon whether the information is delightful information or non-delightful information.

Now, flows of information between different equipments are described. The character in the present embodiment moves between the information providing apparatus and an equipment or between different equipments. Here, flows of information in the present embodiment are described with reference to FIG. 11 which illustrates an information flow processing procedure.

Figure 11:
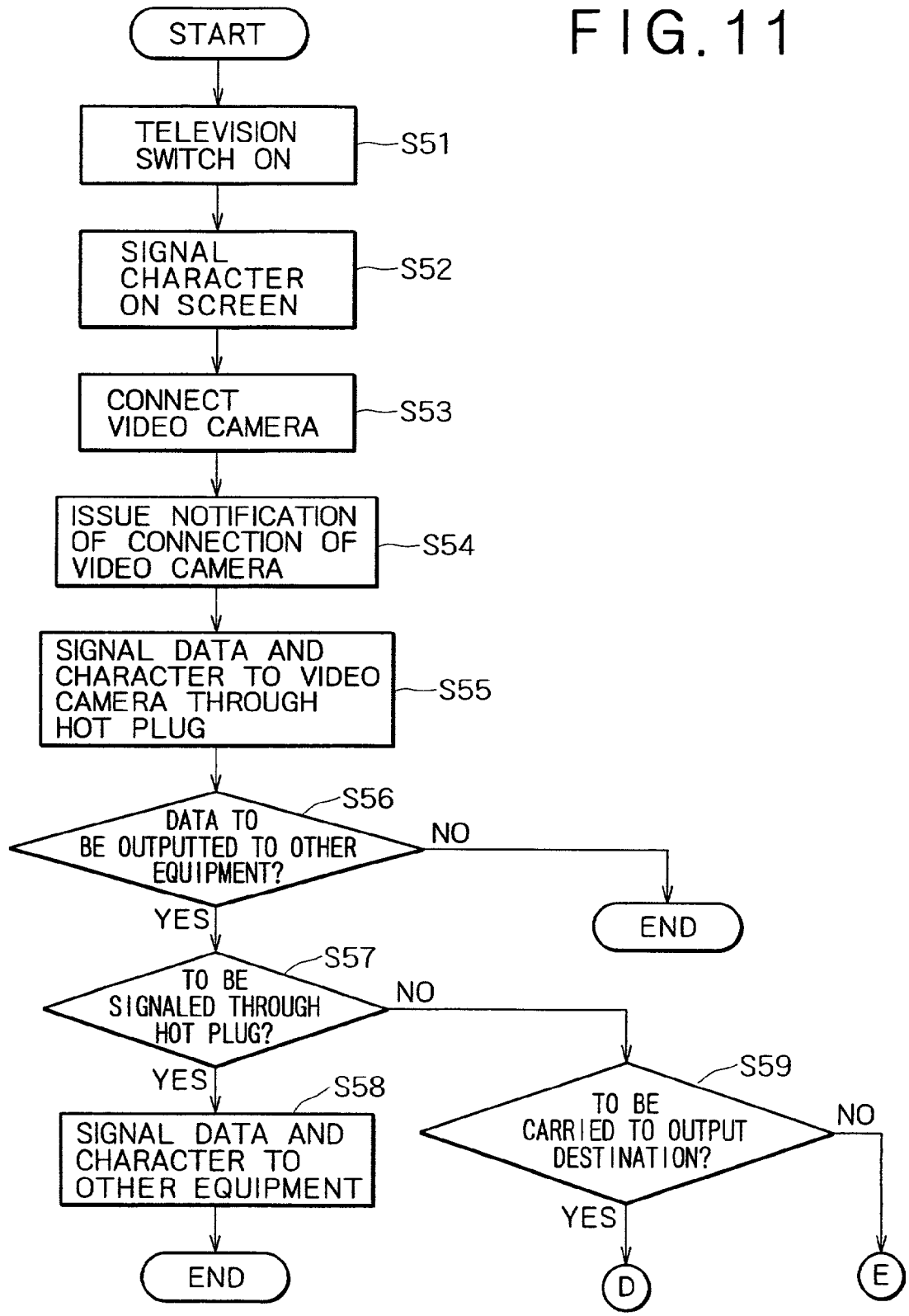
FIG. 11 is a flow chart illustrating an example of an information flow processing procedure.

First, flows of information and movements of the character where all equipments are connected to each other by a hot plug are described with reference to FIG. 11. The process illustrated in FIG. 11 is started, for example, when connection through a hot plug by an IEEE 1394 high speed serial bus described hereinabove is established between a plurality of equipments. It is assumed here that a video camera is connected to a television set such that the user enjoys a video of the video camera on the screen of the television set.

After the connection is established, the power supply switch of the television set will be switched ON (step S51). The information representing that the switch is ON is transmitted to the information collection section 23 of the agent program 22 and the agent program is started up in response to the information, and the character is signaled to the television set through the plotting system 36 and the voice generation system 37 so that the character appears on the screen of the television set (step S52) Then, when the video camera is connected to the television set through the hot plug (step S53), similar connection information is transmitted to the information collection section 23. In response to the connection information, the character on the television screen utters, through the plotting system 36 and the voice generation system 37 described above, like "A video camera has been connected!" to notify the user of the connection of the equipment (step S54).

Then, when the character on the television screen moves to the video camera, the character on the screen is signaled by a branch of the character (that is, copy data of the character data) or another character through the hot plug connected to the video camera (step S55).

After the signaling process is performed in step S55, a question "Should data be outputted also to another equipment?" is asked from the character to the user in step S56. If the user designates that data should not be outputted to another equipment in step S56 (step S56; No), then the processing is ended. Accordingly, the data are not signaled to another equipment or the like.

If data should be outputted also to another equipment in step S56 (step S56; Yes), that is, if the user gives an affirmative answer to the question "Should data be outputted also to another equipment?" asked from the character to the user such as "The data should be outputted", "OK" or "Yes", then an outputting process to another equipment is performed. However, before the outputting process is performed, another question "Should the data be outputted through the hot plug?" is asked from the character and it is discriminated whether or not the data should be outputted to another equipment connected through the hot plug (step S57).

If the data should be outputted through the hot plug in step S57 (step S57; Yes), that is, if the user gives an affirmative answer such as "The data should be outputted through the hot plug", "OK" or "Yes" similarly as above, then the data from the video camera are fetched once onto the HDD 14 of the information providing apparatus 1 and the fetched information is outputted to another equipment, or the data from the video camera are outputted directly to another equipment. At this time, also the character is signaled to another equipment together with the information (step S58). Thereafter, the processing is ended.

If the data should not be outputted through the hot plug in step S57 (step S57; No), that is, if the user gives a negative answer, then since it has already been discriminated that the data should be outputted to another equipment, a question "Should the data be carried to the output destination?" is asked to the user and it is discriminated whether or not the information should be carried to the transfer destination (step S59).

If the user gives an affirmative answer such as "The data will be carried to the transfer destination", "OK" or "Yes" in step S59 (step S59; Yes), then the processing advances to a process D illustrated in FIG. 13. However, if the user gives a negative answer in step S59, then it is discriminated that some other measures should be taken, that is, in the present example, communication should be utilized (step S59; No), and the processing advances to a process E illustrated in FIG. 17.

Figure 12:
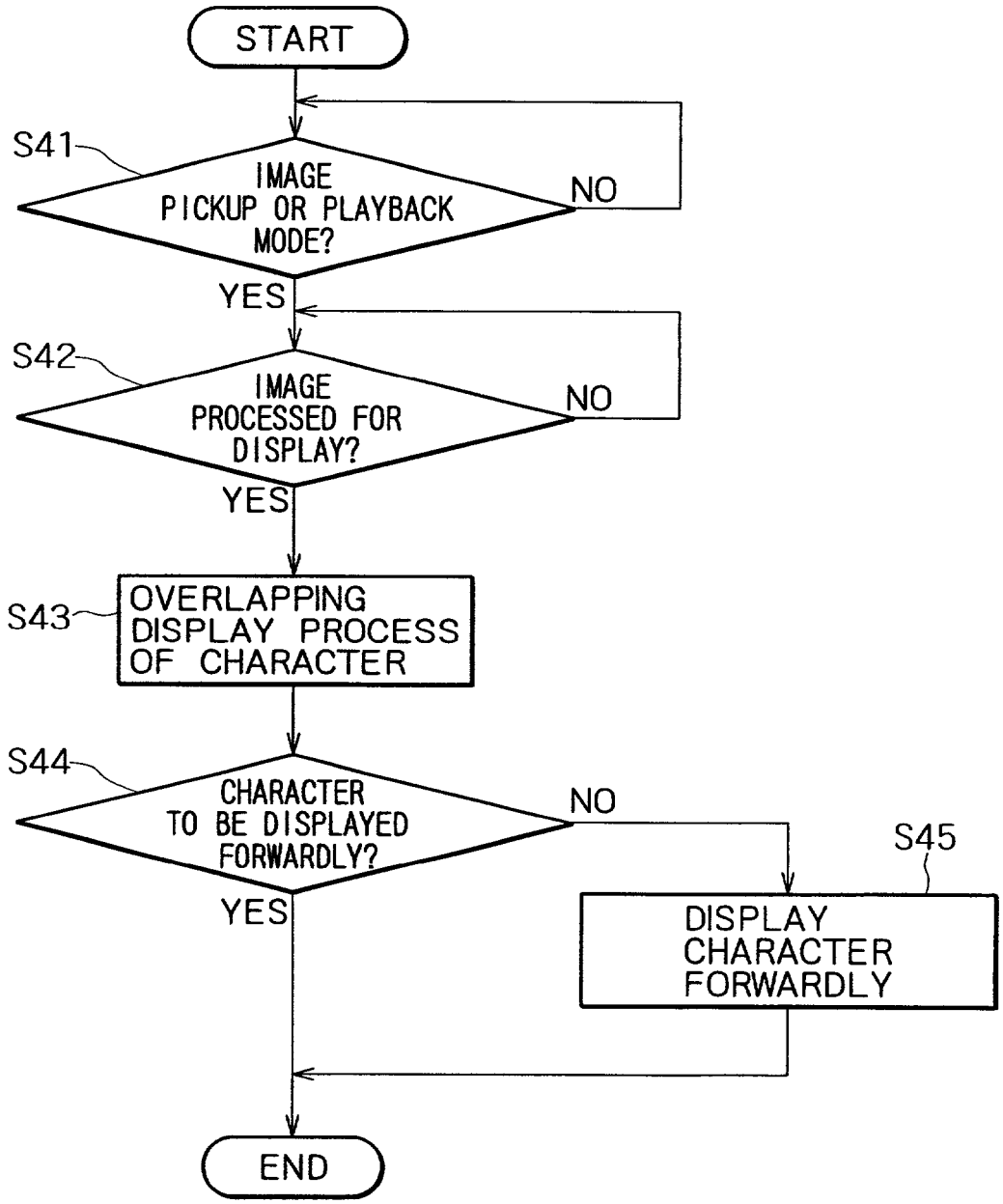
FIG. 12 is a flow chart illustrating an example of a displaying process of the character and a digital video camera.

Now, an example of a procedure when the character is signaled to another equipment, for example, an example of a procedure wherein the character is signaled to a digital video camera and appears on an image picked up by the digital video camera, is described with reference to FIG. 12 which illustrates image pickup of the character together with an image pickup object to be picked up by the digital video camera. The power supply to the digital video camera is already ON and therefore the digital video camera can receive the character signaled thereto, and it is discriminated whether or not the digital video camera is in an image pickup or playback mode (step S41). If the digital video camera is not in an image pickup or playback mode (step S41; No), then it is waited that the digital video camera is placed into an image pickup or playback mode.

If the digital video camera is in an image input or playback mode (step S41; Yes), then it is discriminated whether or not a process of fetching image data to be displayed in the viewfinder (not shown) of the digital video camera from a CCD unit or the like and displaying an image in the viewfinder is performed (step S42). If the process of displaying an image in the viewfinder is not performed (step S42; No), then it is waited that the process of displaying an image in the viewfinder is performed to display an image in the viewfinder. If the process of displaying an image in the viewfinder is performed (step S42; Yes), then a character overlapping display process for displaying character data in an overlapping relationship with an image to be displayed is performed (step S43). After this process, it is discriminated whether or not the character is on the front side of the display (step S44). If the character is on the front side of the display (step S44; Yes), then the displaying process is continued as it is.

However, if the character is not on the front side of the display (step S44; No), then a process for displaying the character on the front side is performed (step S45). Then, the displaying process is continued. In the process of displaying the character on the front side, when an image of the digital video camera and the character are processed so as to be overlapped with each other, image data of the character in a region in which the image of the digital video camera overlaps with the character are acquired while the image of the digital video camera in the region is eliminated so that the character may be positioned on the front side.

However, where the character is displayed translucently, the image of the character may be preferentially disposed on the front side while the image of the digital video camera is displayed as it is without being eliminated. In this instance, the image overlapping with the character can be represented through the character.

Figure 13:
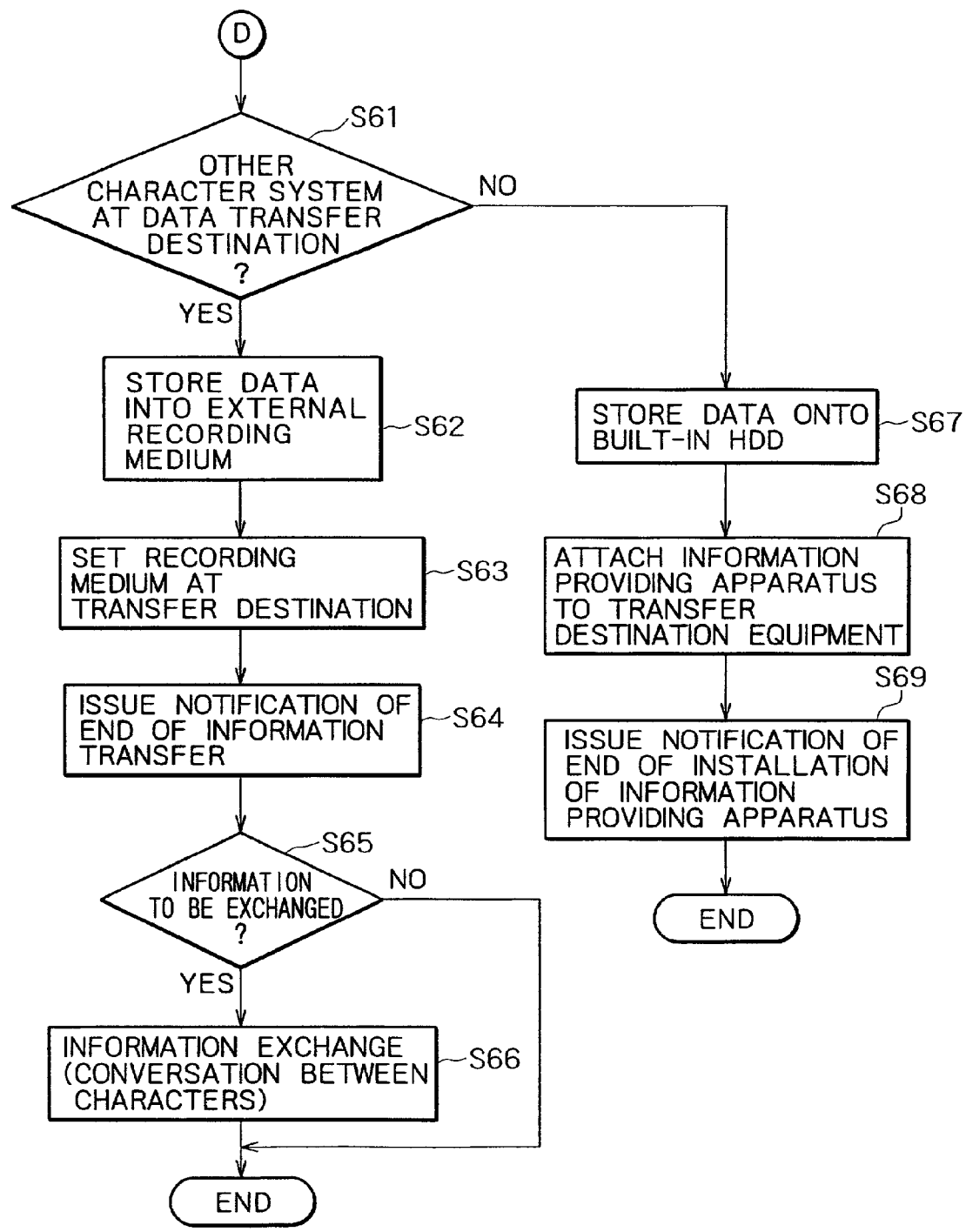
FIG. 13 is a flow chart illustrating an example of a procedure when the user carries information to another equipment.

Now, the process D, that is, a process when the user carries information to a different place, is described with reference to FIG. 13. Here, flows of information and movements of the character between equipments which are not connected to each other through a hot plug are described. The process D relates to transfer of information within a range within which the information can be carried.

Here, description is given of a case wherein, for example, a video camera is connected to a television set in a living room and a video of the video camera is enjoyed in the living room and besides, since, for example, a patient is in a bed room, the video of the video camera is played back simultaneously also by a television set in the bed room so that the video of the video camera may be enjoyed simultaneously by all members of the family.

In the process wherein the user carries information to a different place, it is first discriminated whether or not also a television set in the bed room includes the character system therein (step S61). This discrimination is performed based on, for example, an affirmative answer or a negative answer to a question "Is a character system present at another place?" asked from the character to the user. The answer may be given by voice, selection of a button of a remote controller or some other means.

If a character system is present separately also in the television set in the bedroom in step S61 (step S61; Yes), information will be outputted from the video camera to the character system in the television set in the bed room. In this instance, the information providing apparatus 1 including the character system stores outputted information into a storage medium which can be carried such as a memory card, a CD-R (compact disk recordable) or a magneto-optical disk (MO). In this instance, the information including program information for causing the character to be displayed is recorded (step S62).

Then, the recording medium is carried to the transfer destination by the user and set into the information providing apparatus of the transfer destination (step S63). If another character is present in the apparatus (in this instance, a television set) of the transfer destination, then both of the character originally present in the television set of the bed room of the transfer destination and the character which has carried the information appear and notify the patient that the video information is fetched (step S64).

Then, it is discriminated based on a designation of the user or the like whether or not the characters should exchange information (step S65). If the characters should exchange information in step S65 (step S65; Yes), then the characters exchange their information through conversion between them (step S66). If the characters should not exchange information in step S65 (step S65; No), then the processing is ended.

On the other hand, if another character system is not present in the television set in the bed room (step S61; No), then the information outputted from the video camera is stored into the external storage medium apparatus 1b such as a HDD (step S67). The HDD includes also the character system for processing program data of a character.

The external storage medium apparatus 1b in which the information is stored is carried into the bed room and attached to the television set in the bed room through a hot plug (step S68). Then, if the television set in the bed room is switched ON, then the character appears on the television screen and notifies the patient that the apparatus is connected together with a display such as "I have come from the living room" (step S69). Then, the processing is ended.

Now, a process when the character freely moves between different equipments is described with reference to FIG. 14. Here, description is given of a case wherein the character appears on various equipments connected to the information providing apparatus. In the process illustrated in FIG. 14, the information providing apparatus is connected to a television set in advance, and after the power supply to the television set is switched ON, a personal computer is connected and then a digital camera is connected, whereafter the digital camera is disconnected.

Figure 14:
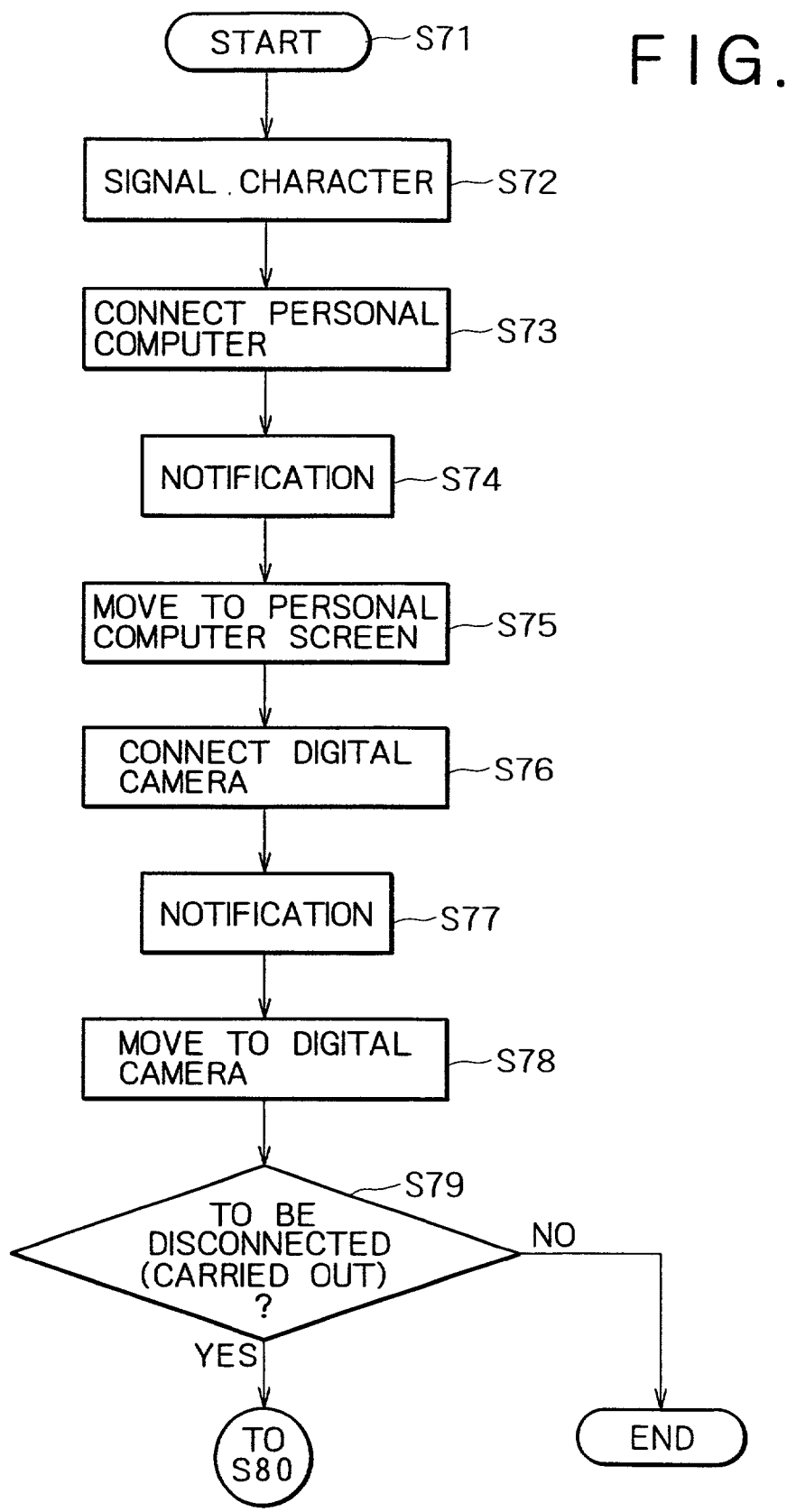
FIG. 14 is a flow chart illustrating an example of a process when the character moves freely between different electric equipments.

The process of FIG. 14 is started when the information providing apparatus and a predetermined equipment are connected to each other through a hot plug for an IEEE 1394 high speed serial bus or when the power supply to the equipment connected to the information providing apparatus is switched ON. For example, where the information providing apparatus and a television set are connected to each other, if the television set is switched ON (step S71), then the switch ON information is transmitted to the information collection section 23 of the agent program 22 and the character is signaled to the television screen through the plotting system 36 and the voice generation system 37 (step S72).

Then, if a personal computer is connected to the television set or the information providing apparatus through the hot plug (step S73), then the connection information is transmitted to the information collection section 23. Consequently, based on the connection information, the character on the television screen utters like "A personal computer is connected" through the plotting system 36 and the voice generation system 37 to notify the user of the connection of the equipment (step S74).

Thereafter, the character displayed on the television screen moves to the display apparatus of the personal computer (step S75). Thereupon, the destination of the character outputted from the information providing apparatus is changed over from the television set to the personal computer, and therefore, the character now appears on the screen of the personal computer by operation of the character system in the personal computer. This movement is performed in accordance with a condition determined in advance. The condition may be, for example, that the time over which the character is displayed on the television screen exceeds a predetermined interval, that operation of the personal computer is started (for example, such an operation of the personal computer as an inputting operation or communication is performed), or the like.

Similarly, if a digital camera is connected to the television set, personal computer or information providing apparatus through the hot plug (step S76), then the connection information is transmitted to the information collection section 23. Consequently, based on the connection information, the character on the screen of the personal computer in which the character data are present utters like "A digital camera is connected" through the plotting system 36 and the voice generation system 37 to notify the user of the connection of equipments (step S77). It is to be noted that, if the character has moved from the screen of the personal computer to the screen of the television set, then the character naturally issues the notification from the screen of the television set.

Thereafter, the character displayed on the personal computer screen moves to the digital camera (step S78). Thereupon, the destination of the character data outputted from the information providing apparatus is changed over from the personal computer to the digital camera, and the character data are processed by the character system in the digital camera.

Since the digital camera is a portable equipment, it is discriminated whether or not the digital camera should be carried to the destination when the user goes out (step S79). For example, such a question as "Do you go out together with me?" is asked from the character to the user.

Figure 15:
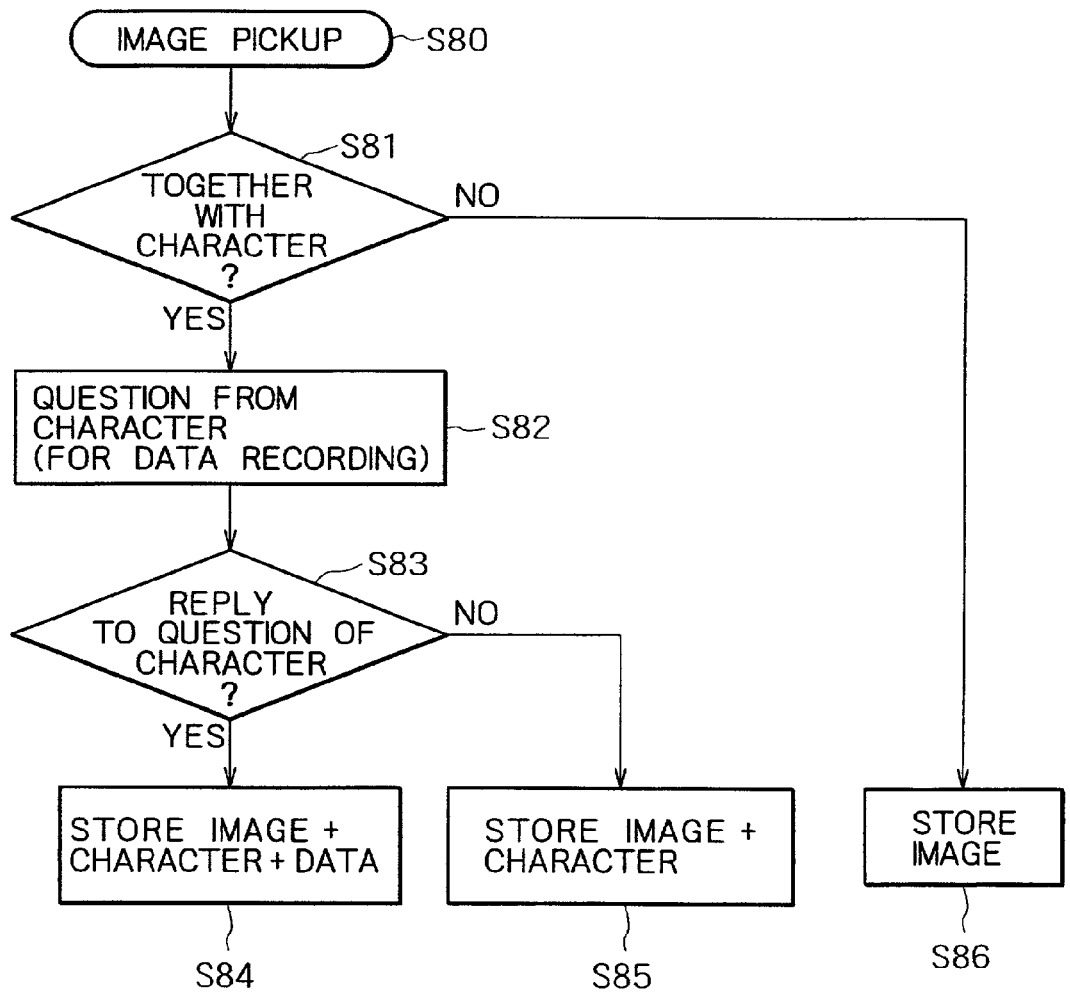
FIG. 15 is a flow chart illustrating an example of a displaying process of the character on the digital camera.

If the digital camera should not be carried (step S79; No), then the processing is ended. On the other hand, if the digital camera should be carried when the user goes out (step S79; Yes), then the data of the character are stored into a storage section (for example, a memory card) provided for the digital camera, whereafter processing in next steps (steps S80 et seq.) illustrated in FIG. 15 is performed.

It is to be noted that, in this instance, it is presupposed that at least a control section such as a CPU which performs necessary processing based on a program for displaying the character on a screen is provided on the digital camera side. Naturally, if the digital camera has a function equivalent to that of the character system 21, then it can perform equivalent operation to that of the information providing apparatus 1.

In this instance, if the amount of data which can be stored into the storage section of the digital camera is limited from the capacity of the storage section, then at least data for allowing a limited number of forms of the character to be displayed and a program for causing the character to be displayed based on the data are stored into the storage section.

If the digital camera has a sufficient capacity, also a storage section for storing data of information relating to going out of the user for allowing the character to utter predetermined words and data for allowing words to be inputted using a button of the digital camera as well as inputted data is provided in the digital camera.

Where such storage sections are provided, such a question as "Where are you going today?" from the character can be displayed on the digital camera at the destination when the user goes out, or the user can answer to the question or the answer can be stored.

Figure 16:
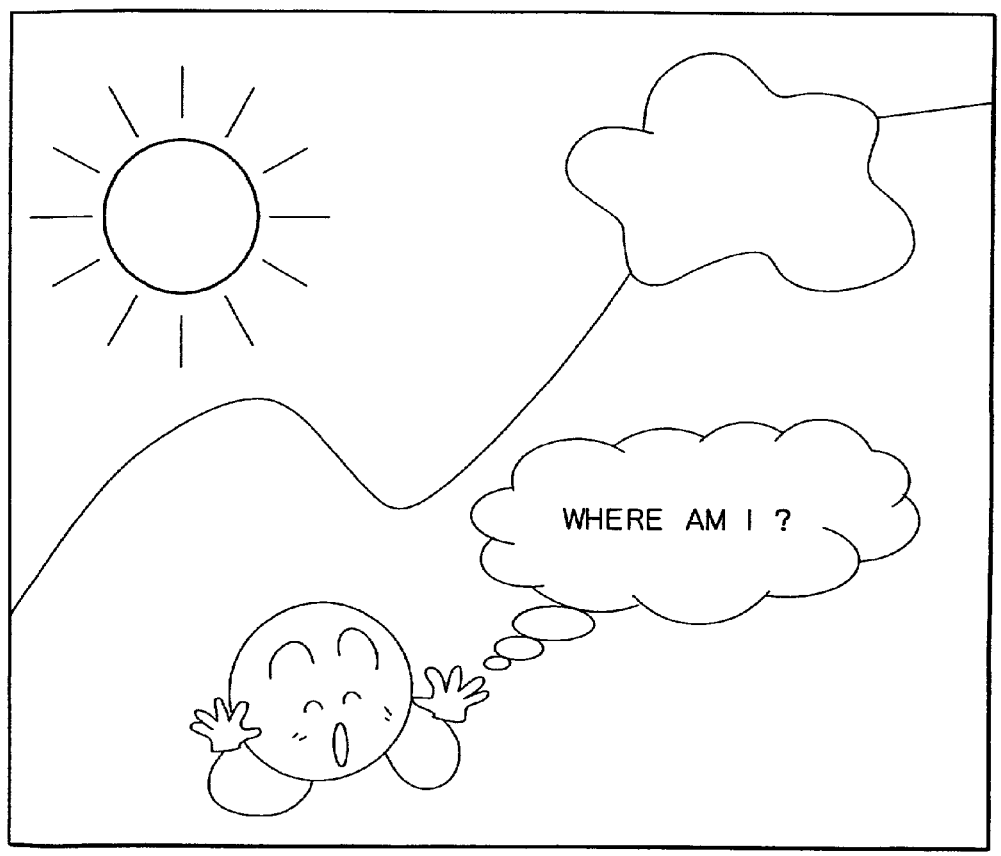
FIG. 16 is a schematic view showing an example of a screen of the digital camera.

Now, an example of a displaying process of the character by the digital camera is described with reference to FIGS. 15 and 16. In the example, storage only of an image, storage of an image and the character or storage of an image, the character and data (place data, etc.) can be stored. If it is determined to use the digital camera to pick up an image at the destination when the user goes out (step S80), then it is discriminated whether or not the character should be picked up together with an image pickup object (step S81). At this time, such a question as "Can I join?" is asked by the character of the digital camera, and the discrimination is performed based on data inputted by the user in response to the question.

If the character should not be picked up together (step S81; No), then an image which does not include the character is stored. It is to be noted that, although only an image is stored here, a process of adding data of a place or the like may be performed as hereinafter described.

On the other hand, if the character should be picked up together (step S81; Yes), then a question "Where am I?" is asked, for example, as seen in FIG. 16 (step S82). This question is issued in order to acquire data relating to the picked up image and may relate not only to the place but also to information of a climate, a person or persons, a landscape and so forth.

Here, it is discriminated whether or not the user answers to the question from the character through inputting of data by the user as an answer to the question (step S83) If the user answer (step S83; Yes), then the control section of the digital camera stores the picked up image data, the data for displaying the character and the inputted data (such as, for example, the name of a place) as an answer to the question collectively as a set of data (step S84). For the inputting, the data may be inputted, for example, by voice if the digital camera has a voice inputting function, and the voice itself is stored as it is or converted into and stored as character data. It is to be noted that the digital camera may be connected to some other equipment such as, for example, an information terminal such as a portable telephone set such that data may be inputted to the digital camera from the information terminal connected thereto.

If the user should not answer to the question from the character (step S83; No), then the control section of the digital camera stores the picked up image data and the data for displaying a form of the character as a set of data (step S85).

In this manner, it is possible to display the character on the digital camera at the destination when the user goes out and fetch the character as an image together with a landscape at the destination. It is to be noted that, while the description given above relates to a digital camera, not only a digital camera but also any equipment which can pick up an image such as a video camera or a personal computer including an image pickup apparatus can be used.

When the user comes home from the destination after it goes out, if the digital camera is connected to the information providing apparatus or the television set connected to the information providing apparatus through the hot plug again, then an image of the digital camera can be outputted to the television screen or the like. Simultaneously, the character data, input data and so forth from the digital camera are fetched into the information providing apparatus.

The information providing apparatus controls the character to utter predetermined words based on the data inputted at the destination when the user goes out and fetched into the digital video camera. For example, the information providing apparatus reads the input data at the destination, the character data and so forth included in the image data when it displays an image picked up at the destination on the television screen.

As such input data, for example, such a word as "Kamakura" has been inputted to the question of "Where am I?" from the character. The information providing apparatus reads out the word "Kamakura" as the input data and reads out the words "We were happy in XX, weren't we?" from the providing information storage section 31, and then stores the read out words once into the RAM 13 or the like.

Then, the words "We were happy in XX, weren't we?" and the word "Kamakura" are combined so that the character may utter like "We were happy in Kamakura, weren't we?"

In this instance, if only the words "We were happy in XX, weren't we?" are uttered every time, then the sympathy with the character may decrease, and therefore, some other words such as "XX was very nice!" or "I'd like to go to XX again." are suitably used selectively.

In this manner, with the information providing apparatus, the character freely moves between or among the electric equipments connected to one another through the hot plug and acts together with the user so that it may communicate intimately with the user.

Figure 17:
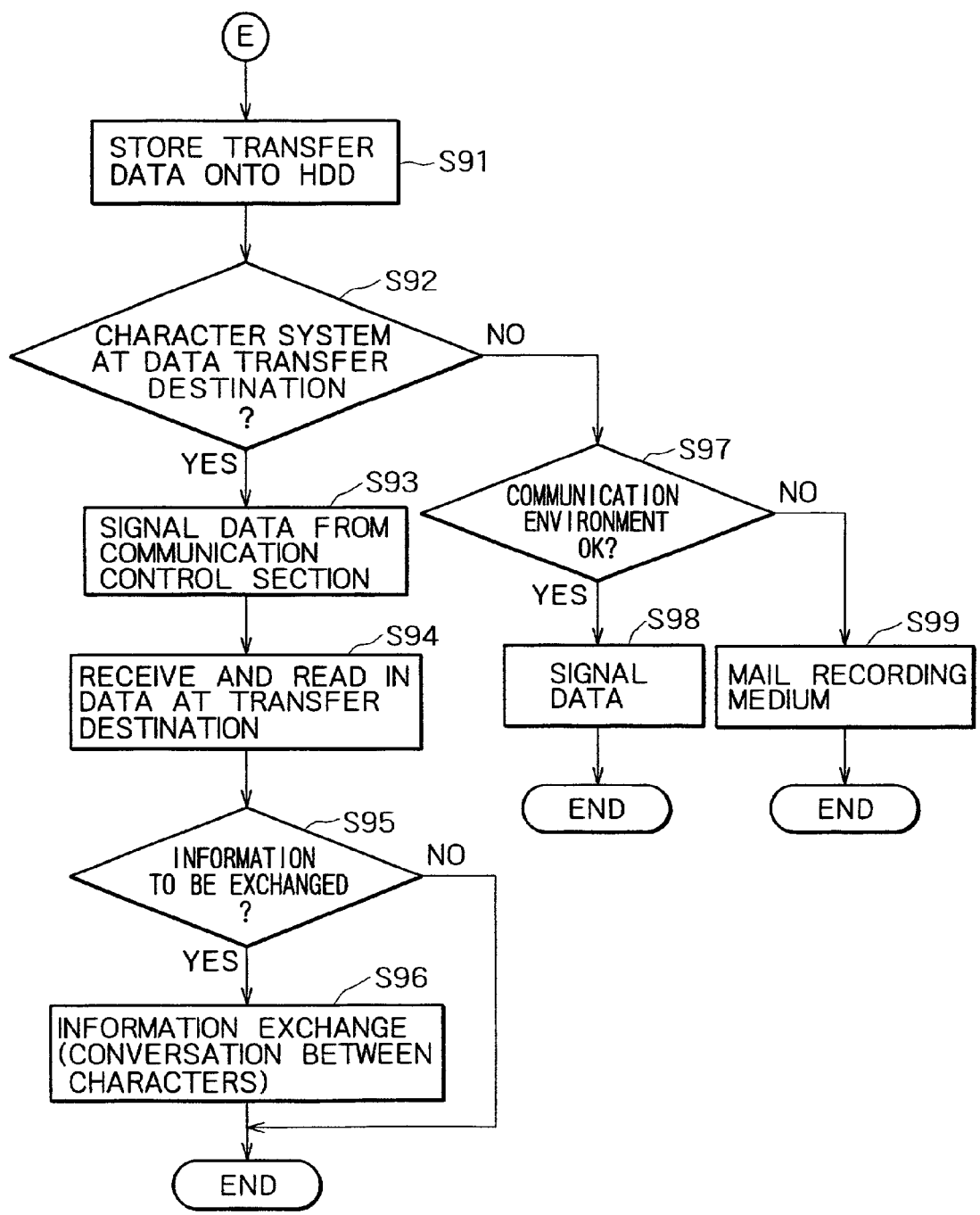
FIG. 17 is a flow chart illustrating an example of a procedure of an information transfer process in which communication is utilized.

Now, an information transfer process (process E) which makes use of communication is described with reference to a flow chart of FIG. 17. The process E allows the user to transfer information while the user remains at a site. It is presupposed that the opposite party can communicate information.

The process is executed when the user gives a negative answer in step S59 of FIG. 11 as described above. First, transfer data (information from the video camera and the data of the character to be transferred) information is stored into a storage section such as a HDD (step S91).

Then, it is discriminated through communication whether or not the transfer destination includes a character system (step S92). If the transfer destination includes a character system (step S92; Yes), then the information is signaled from the communication control section 16 of the information providing apparatus 1 toward the transfer destination (step S93).

For example, if the equipment at the signaling destination is a television set, then such an image that a character receives a mail is displayed on a display apparatus of the television set, and the data are read in and presented if the mail is designated on the signaling destination equipment by the user (step S94).

Then, it is discriminated whether or not information exchange should be performed at the signaling destination of the data (step S95). If information exchange should be performed (step S95; Yes), then the characters talk with each other to exchange information between them (step S96). If information exchange should be performed (step S95; No), then the processing is ended.

On the other hand, if the transfer destination does not include a character system (step S92; No), then it is discriminated whether or not the transfer destination is in environment ready for communication (step S97). If the transfer destination is in environment ready for communication (step S97; Yes), then the information is signaled toward the equipment (step S98), whereafter the processing is ended.

If the transfer destination is not in environment ready for communication (step S97; No), then the data are stored into a recording medium to prepare a recording medium which is to be sent by a mail or the like which does not utilize communication (step S99), whereafter the processing is ended. Although the mailing itself is performed artificially, the storage of the data into a recording medium is performed automatically. However, if a recording medium is not present or in a like case, then the character issues a message to instruct the user to prepare a recording medium and successively issues instruction messages in accordance with a procedure for recording into a recording medium. Thus, if the user operates in accordance with the instruction messages; then a recording medium to be mailed can be produced.

It is to be noted that, where data are signaled through communication as described above, if the capacity of the knowledge database 26 is so large that much time is required for the communication, then the knowledge database 26 may be placed on a web with an ID applied thereto such that, when the data are to be read by the opposite party, only a necessary portion of the data may be taken out from the web and read by the opposite party.

Figure 18:
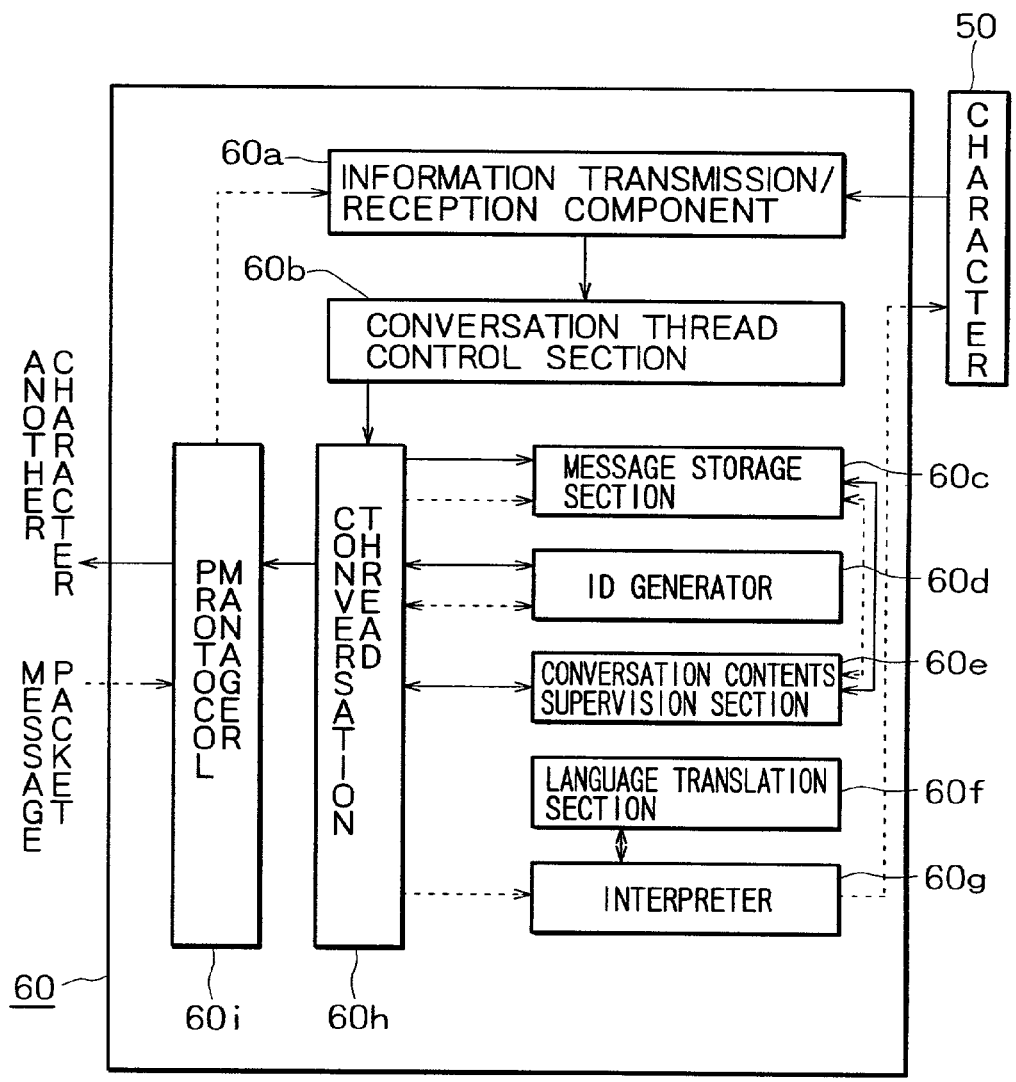
FIG. 18 is a block diagram showing an example of information exchange between different characters.

Now, an example of information exchange between the user and the character or between different characters is described with reference to FIG. 18. A character 50 has been present as character program data in and sent from an equipment of a signaling source to an equipment of a signaling destination. The character 50 can signal or receive a message packet to talk with the character management system 60.

The message packet contains a message type, a signaling source address of the message, a destination address of the message, a conversation (question-answer) ID for connecting a question and an answer, language type information for specifying the language to be used, program type specification information for specifying the type of a program for the character such as a translation or a search program, various contents which are details of information to be transmitted/received, and so forth. The contents include also software for forming an instruction after the character moves to another equipment.

An information transmission/reception component 60*a* receives a message from the character 50 or information incidental to the character 50 and transmits the message to the character 50, an equipment connected through a hot plug, an existing system or a network.

A conversation thread control section 60*b* manages a conversation thread 60*h* corresponding to each conversation with the character 50 or the like, and produces a suitable thread in accordance with a flow of conversation or passes the control to a thread produced already. A plurality of such conversation threads 60*h* may be produced such that conversation may proceed parallelly but asynchronously with a plurality of characters.

A message storage section 60*c* stores a conversation. A conversation contents supervision section 60*e* performs a policy check of discriminating from logs of conversation stored in the message storage section 60*c* and contents uttered at present whether or not the conversation can be established.

A language translation section 60*f* translates a language used for conversation into another language when necessary. An interpreter 60*g* interprets and executes contents of conversation.

Now, operation states of the components described above upon utterance are described with reference to arrow marks shown in FIG. 18. The character 50 signals a message packet to the character management system 60 in the character system 21.

The character management system 60 receives the message packet and discriminates whether the message packet is for origination of utterance or for reception of utterance. If the character management system 60 discriminates that the message packet is for origination of utterance, then the character management system 60 requests the conversation thread control section 60b to perform necessary processing.

The conversation thread control section 60b refers to an answer ID included in the message packet and, if a conversation thread is produced already, then the conversation thread control section 60b passes the processing to the corresponding conversation thread 60h. On the other hand, if the conversation thread control section 60b discriminates that the conversion is new, then it produces a conversation thread 60h newly and instructs an ID generator 60d to allocate a new conversion ID through the conversation thread 60h, whereafter it passes the control to the conversation thread 60h.

The message storage section 60c stores the message packet sent to the conversation thread 60h. The conversation contents supervision section 60e receives the message packet and performs a policy check to discriminate whether or not conversation is established from the logs of conversation stored in the message log and contents being uttered at present. If conversation is not established, then the conversation contents supervision section 60e discriminates that this is an error and performs such a process as to send an "error" message packet in response to the message packet.

If the conversation contents supervision section 60e discriminates that conversation is established, then the message packet is transmitted from the conversation thread 60h to another character, equipment (node) or the like designated through a protocol manager 60i. At this time, the protocol manager 60i converts the message packet into another message packet in accordance with a protocol suitable for the transmission destination.

Now, operation states of the components of the character, equipment (node) or the like which receives the thus signaled message packet are described with reference to broken line arrow marks in FIG. 18.

The information transmission/reception component 60a which receives the message packet from the protocol manager 60i discriminates whether the message packet is for origination of utterance or for reception of utterance. If the information transmission/reception component 60a discriminates that the message packet is for reception of utterance, then it request the conversation thread control section 60b to perform necessary processing.

The conversation thread control section 60b refers to an answer ID included in the message packet and, if a conversation thread is produced already, then the conversation thread control section 60b passes the processing to the corresponding conversation thread 60h. On the other hand, if the conversation is a new conversation, then the conversation thread control section 60b produces a new conversation thread 60h and instructs the ID generator 60d to allocate a new conversation ID through the conversation thread 60h, whereafter it passes the control to the conversation thread 60h. The message storage section 60c stores the message packet sent to the conversation thread 60h.

The conversation contents supervision section 60e receives the message packet and performs a policy check to discriminate whether or not conversation is established from the logs of the conversation stored in the message storage section 60c and contents being uttered at present. If conversation is not established, then the conversation contents supervision section 60e determines that this is an error, and performs such a process as to send a message packet of an "error" in response to the message packet.

If the conversation contents supervision section 60e discriminates that conversation is established, then the conversation thread 60h passes the control to the interpreter 60g. If the interpreter 60g corresponding to the language type of the received message packet and the program type specification information is registered, then the interpreter 60g is utilized to interpret the contents. If the interpreter corresponding to the language type of the received message packet and the program type specification information is not registered, then it is discriminated whether or not an interpreter library to which the system can access includes the interpreter corresponding to the combination of them.

If the interpreter library does not include such an interpreter, then it is determined that the received message packet cannot be processed. If the interpreter library which can be accessed by the system includes the interpreter corresponding to the combination described above, then the interpreter 60g is registered and used to interpret the contents of the message packet. At this time, if necessary, the message packet is translated by the language translation section 60f.

A result of the interpretation of the interpreter 60g is transmitted to the character 50 and the character 50 performs a process corresponding to contents of the instruction described in the contents of the message packet. For example, if the received message requests for origination of information, then the character 50 originates information of the object of the request. The conversation thread 60h waits until a next message packet is received.

Information can be exchanged between the character 50 and the user or another equipment in such a manner as described above. It is to be noted that information exchange between characters is not limited to that of the system described above, but may be performed through a method call (subroutine call or message passing) or the like.

Figure 19:
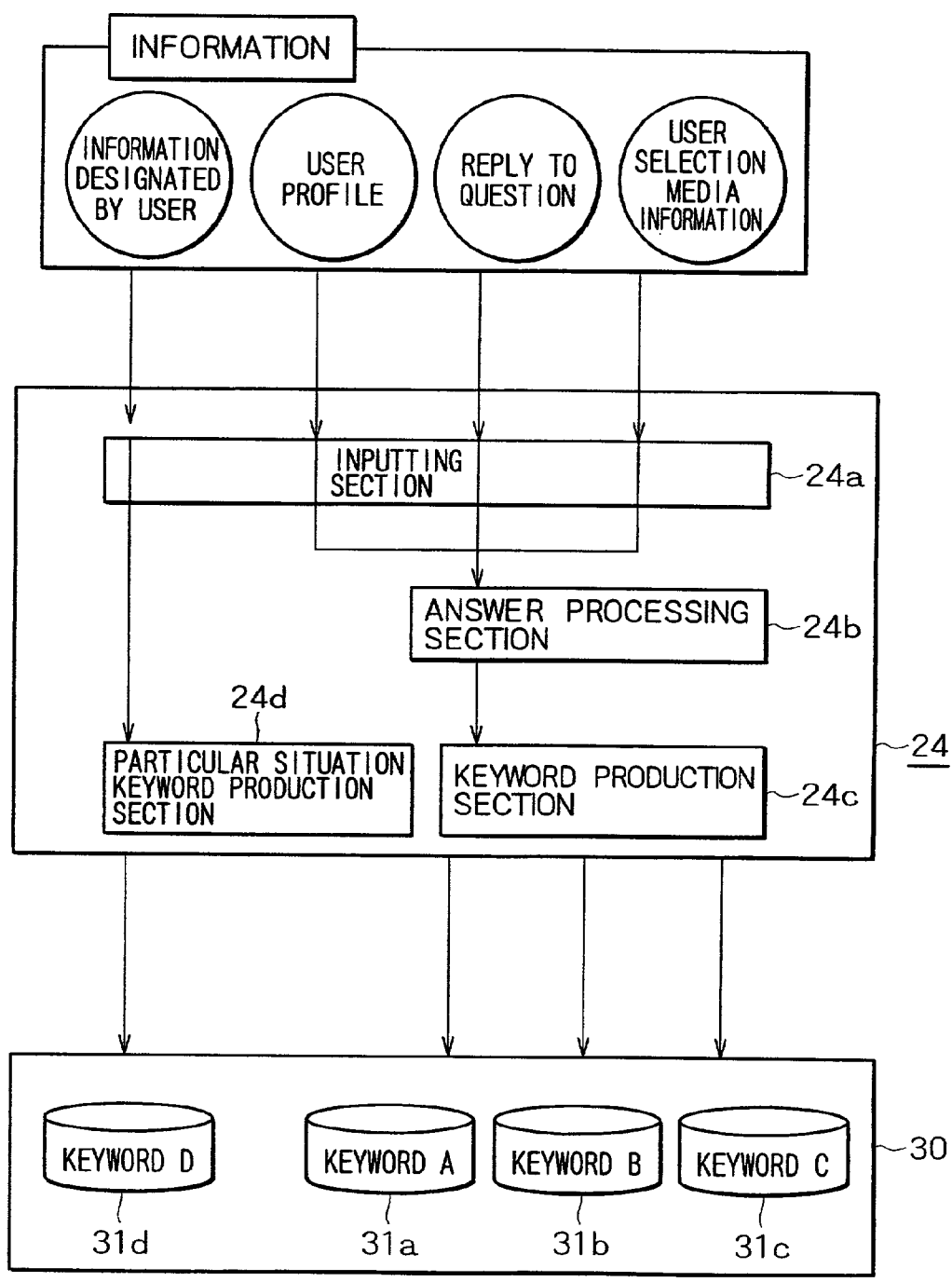
FIG. 19 is a block diagram showing an example of a keyword production system.

Now, a keyword production system for selecting information to the user is described with reference to a block diagram of FIG. 19 which shows an example of the system just mentioned. As seen from FIG. 19, a keyword is produced by the information analysis section 24 of the agent program 22 based on information inputted to an inputting section 24a.

It is to be noted that the information mentioned just above includes information designated by the user, a user profile, an answer to a question asked from the character, media information selected by the user and so forth. Further, the media information is selected by the user and is such as, for example, information checked by the user every time or information recorded specifically.

It is to be noted that, as exemplary contents of a question asked from the character, for example, in order to grasp the tendency of the interest of the user, such questions as "Do you read books frequently?", "Do you often enjoy the music?", "Which do you like better to play outdoors or to stay indoors?", "Are you interested in financial engineering?", "Do you travel often?" and "Do you associate with your relatives often?" are asked.

Further, in order to produce a more detailed keyword, such questions as "Who is your favorite artist?", "What kind of sports do you like better?", "What do you want the most now?", and "What event is scheduled this month?" are asked. Such conversations are performed by the process described hereinabove with reference to FIG. 18.

Answers to the questions, a user profile and information transferred between a plurality of electric equipments are inputted to the inputting section 24.

An answer processing section 24b analyzes and classifies the information into different fields such as basic information of the user, the life habit of the user, and the object of the interest of the user.

After the information is analyzed and classified in such a manner as described above, a keyword production section 24c actually produces particular keywords for each of the classified groups. The keywords are stored in the individual groups into keyword databases 31a to 31c provided in the keyword storage section 30.

In this instance, if the keywords are ranked in regard to the degree of significance, then when information is to be provided based on a keyword, information can be provided conveniently beginning with that information which is most required by the user.

It is to be noted that such questioning from the user as described above is repetitively performed in a predetermined cycle such as after every one week or after every one month, and if a new answer is acquired, then a keyword is produced every time and stored into a suitable one of the keyword databases 31a to 31c.

In this manner, a keyword regarding an object of the interest of the user can always be produced timely. It is to be noted that, since the keyword storage section 30 has a limited storage capacity, it may be configured such that a permissible storage amount is determined for each of the groups and, after keywords are stored up to the permissible storage amount, they are automatically deleted successively beginning with the oldest one when a new keyword is to be stored.

It is to be noted that, in addition to such production of a keyword of an object of the interest of the user through questioning which is repeated daily as described above, when the user wants to acquire some information immediately or in a like case, the user may positively input a keyword not through answering to a question.

For example, in case the user must go to Hokkaido urgently on business, if the user inputs like "airline ticket for Hokkaido", then a particular situation keyword production processing section 24d produces two keywords of "Hokkaido" and "airline ticket" from the inputted sentence, and the produced keywords are stored into a particular situation keyword database 31d.

Additionally, user information may be taken in or a keyword may be produced from the daily life of the user not through such inputting as described above. For example, switching on of a television set is stored every time, and hours in which the television set is switched ON most frequently are detected to grasp a time zone in which the user watches the television most frequently. Further, a keyword regarding a matter of an object of the interest of the user can be produced from contents of a video recorded specifically by the user.

The contents of questions or conversation from the character may be changed depending upon attributes of the user such as the distinction of sex, the occupation and the age. To this end, when the character appears, such a question as "Whom do you want to talk?" is asked from the character, and the conversation proceeds in accordance with the selected personality.

A secret command may be prepared for such contents of a question or conversation from the character as described above so that the contents talked with the character may be secret. Or else, another command for permitting such contents as mentioned above to be talked only to a particular person may be prepared. This makes it possible to convey a will of the user only to a particular person when information is exchanged between characters.

If the equipment on which a character is displayed is, for example, a refrigerator, then if the refrigerator is opened, then the character may appear on the display section and inform the user of taste-appreciable terms of foodstuffs, indicate a menu which can be prepared using foodstuffs present in the refrigerator and/or indicate the calorie of the menu.

Where the configuration just described is employed, when some foods are purchased, information of the foods must be inputted to the information providing apparatus. Further, if the inputted food information is stored as a list and the information of any food is deleted from the list when the food is consumed, then the latest information can always be stocked advantageously. It is to be noted that such food information may be automatically stored by reading a bar code applied to the packet of a food or origination information applied to a commodity or the like and relating to the commodity.

Further, when the power supply to a television set or the like is disconnected, the character may inform the user of a connection state to other electric equipments. For example, when the power supply to an electric equipment which emits sound such as a television set or a radio set is disconnected, if a signal representative of the disconnection of the power supply to the television set or radio set is received, then the character may generate a warning in regard to an electric equipment currently connected, for example, through such a message as "The air conditioner is on", "The washing machine is on" or the "The iron is on" or by sound.

Such warning by the character is possible, for example, by the following configuration. In particular, when the power supply to a particular electric equipment (for example, a television set) is switched off by remote control, the television set receives the switch off signal and disconnects the main power supply thereto. In this instance, a connection state of electric equipments connected to the television set is confirmed between the reception of the switch off signal and the actual switching off of the main power supply, and the name of each electric equipment which is in an on state is detected from the ID of the electric equipment and uttered by voice or the like. This allows the user to grasp states of various electric equipments before the user goes out, and therefore, the anxiety about a miss of switching off of the power supply and so forth can be eliminated.

It is possible to utilize the character as a help to a personal computer or the like. The character appears on the monitor of the personal computer and instructs the user of operations of the personal computer so that the user can recognize well. In this instance, if the model of the personal computer used by the user is set in advance, then such detailed instruction as "Please depress the second key from the left" can be issued.

According to the present invention, as described above, the character is signaled to any of the electric equipments, and on the electric equipment, information is provided through the character to the user based on character representation data. To this end, the character appears on the electric equipment, for example, at a corner of a television screen, and acquires various kinds of information or images the character, upon image pickup by an electric equipment such as, for example, a video camera, in an overlapping relationship with the image of the video camera and then stores both data in an overlapping relationship with each other.

Further, since the character can be represented not only in a form wherein it is recognized through the sense of sight but also in another form wherein it is represented in the form of particular sound, voice or the like, even if the electric equipment does not have displaying means, if it is modified so as to have sound generation means like a speaker, then the character can be represented.

Accordingly, with the information providing system, information providing apparatus and information providing method, it is possible to allow a character, that is, an electronic pet as an imaginary living body, to live in an electric equipment and communicate very frequently with the user or to freely move between different electric equipments owned by the user and represent information in various forms of representation on a desired one of the electric equipments. Further, information of a connection state of the electric equipments and information of each of the electric equipments can be represented in various manners of representation to inform the user of the information when the user tries to use some other electric equipment or disconnect the power supply to some of the electric equipments.

Further, if the user who is in such an environment wherein the user feels much stress and cannot keep a pet from a residential limitation can communicate with a character which appears each time the user operates an equipment, then the user will feel very happy when the user turns on the equipment. Further, if the character stores increasing information and grows up, then the user will be able to have a happy feeling in such rearing of the character and also have an increased happy feeling in operation of the equipment.

While a preferred embodiment of the present invention has been described using specific terms, such description is for illustrative purposes only, and it is to be understood that changes and variations may be made without departing from the spirit or scope of the following claims.

What is claimed is:

1. An information providing system, comprising:
a plurality of pieces of interconnected electric equipment for transmitting and receiving character data,
each of said plurality of pieces of electric equipment including:
a character system for processing the character data;
representation means for representing a character to a user of the piece of electric equipment; and
connection means for establishing a connection to an other of the plurality of pieces of electric equipment;
a user attribute information storage section for storing user attribute information including a user profile, wherein
the character system processes the character data based on character representation data to provide the character with a predetermined representation,
the character representation data includes the user attribute information readout from the user attribute storage section;
the character data and the character representation data are transmitted and received between each of the plurality of pieces of electric equipment through the connection means; and
said representation means provides information in accordance with the user attribute information to the user through the character.

2. The information providing system according to claim 1, wherein the representation means of each of the plurality of pieces of electronic equipment includes one of a display section for visually displaying the character to the user and a sound generation section for causing the user to audibly recognize the character.

3. The information providing system according to claim 2, wherein the character is one represented by the display section in a visual overlapping relationship with other image data and represented by the sound generation section in an audible overlapping relationship with other sound data.

4. The information providing system according to claim 1, wherein the connection means includes an interface formed to be hot plug compliant with one of an IEEE 1394 standard and a USB standard.

5. The information providing system according to claim 1, wherein the character representation data include: character rule data for determining a manner of the character; the user attribute information including the user profile; and information to be provided to the user, and wherein the character system further includes a character rule storage section and an information storage section.

6. The information providing system according to claim 5, wherein the character representation data further include a keyword indicative of an object of interest of the user and the character system further includes a keyword storage section.

7. The information providing system according to claim 6, wherein the user attribute information is obtained by collecting data based on answers inputted by the user in response to questioning items provided from the character to the user.

8. The information providing system according to claim 7, wherein the keyword is produced based on the user attribute information.

9. The information providing system according to claim 1, wherein the character representation data are stored in a storage medium together with the character data such that the character representation data can be outputted by disconnecting the storage medium from one of the plurality of pieces of electric equipment and connecting the storage medium to the other of the plurality of pieces of electric equipment.

10. The information providing system according to claim 1, wherein the character representation data are transmitted from one of the plurality of pieces of electric equipment to the other of the plurality of pieces of electric equipment using a communication network includes an Internet.

11. The information providing system according to claim 1, wherein desired information such as information of a television broadcast is selected from media information based on a keyword and is provided to the user through the character.

12. An information providing apparatus for causing a representation section of a piece of electric equipment to display a character to provide information to a user corresponding to the piece of electric equipment, the apparatus comprising:
connection means for establishing a connection to an other piece of electric equipment to one of transmit and receive character data indicative of the character; and
a character system for processing the character data, and including a user attribute information storage section for storing user attribute information including a user profile, wherein the character system processes the character data based on character representation data to provide the character with a predetermined representation, and wherein the character representation data includes the user attribute information;

wherein the character data and the character representation data are transmitted and received between each piece of electric equipment; and the representation section provides information in accordance with the user attribute information to the user through the character.

13. The information providing apparatus according to claim 12, wherein the connection means comprises an interface that is hot plug compliant with one of an IEEE 1394 standard and USB standard.

14. The information providing apparatus according to claim 12, wherein the character representation data include: character rule data for determining a manner of the character; the user attribute information including the user profile; and providing information to be provided to the user; and wherein the character system includes a character rule storage section and a providing information storage section.

15. An information providing method for allowing character data to be one of transmitted and received between a plurality of pieces of interconnected electric equipment, the method comprising the steps of:

one of transmitting the character data to one of the plurality of pieces of electric equipment from an other of the plurality of pieces of electric equipment, and receiving the character from one of the plurality of pieces of electric equipment using connection means for connecting each of the plurality of pieces of electric equipment;

processing the character data based on character representation data to provide the character with a predetermined representation by a character system that processes the character data;

storing user attribute information including a user profile, processing the character data based on character representation data to provide the character with a predetermined representation, and wherein the character representation data includes the user attribute information; and providing information in accordance with the user attribute information to a user of the electric equipment through the character.

16. The information providing method according to claim 15, wherein the step of providing information to the user through the character is performed using one of a display section for visually displaying the character to the user or a sound generation section for causing the user to audibly recognize the character.

17. The information providing method according to claim 16, wherein the character is represented by one of visually overlapping the character with other image data and by audibly overlapping a sound with other sound data.

18. The information providing method according to claim 15, wherein when the information is provided to the user through the character, information searched out using a keyword produced based on individual information of the user is provided.

19. The information providing method according to claim 18, wherein the individual information of the user is user attribute information obtained by collecting data based on answers inputted by the user in response to questioning items provided from the character to the user.

20. The information providing method according to claim 15, wherein the character representation data are stored in a storage medium carried together with the character data such that the character representation data are outputted by disconnecting the storage medium from one of the plurality of pieces of electric equipment and connecting the storage medium to an other one of the plurality of pieces of electric equipment.

21. The information providing method according to claim 15, wherein the character representation data are transmitted from one of the plurality of pieces of electric equipment to an other of the plurality of pieces of electric equipment using a communication network including an Internet.

22. A data recording medium on which a program to be executed by a computer is recorded, the program comprising the steps of:

collecting user attribute information and information searched for and obtained based on the user attribute information from a piece of electric equipment;

determining a mode of representation of a character based on the user attribute information and the searched information;

storing user attribute information including a user profile, processing the character data based on character representation data to provide the character with a predetermined representation, and wherein the character representation data includes the user attribute information; and presenting the searched information in accordance with the attribute information to a user of the electric equipment through the character.

23. The data recording medium according to claim 22, wherein the program further comprises the step of producing a keyword unique to the user based on the user attribute information.

24. The data recording medium according claim 23, wherein the keyword production step includes the sub steps of: issuing a question to the user through the character; collecting data of an answer inputted by the user in response to the question; and producing the keyword based on the collected answer data.

25. The data recording medium according to claim 23, wherein the keyword production step includes the sub steps of: collecting information selected based on the user attribute information; and producing the keyword based on the collected information.

* * * * *

UNITED STATES PATENT AND TRADEMARK OFFICE
CERTIFICATE OF CORRECTION

| | | |
|---|---|---|
| PATENT NO. | : 7,146,095 B2 | |
| APPLICATION NO. | : 09/950138 | |
| DATED | : December 5, 2006 | |
| INVENTOR(S) | : Akiko Asami | |

It is certified that error appears in the above-identified patent and that said Letters Patent is hereby corrected as shown below:

Title Page, Item (57) Abstract line 13, "The character system rocesses the character data" should read --The character system processes the character data--.

Column 8, line 43 "section id which can represent" should read --section 1d which can represent--.

Column 26, line 28, insert a --.-- after "(step S83)".

Claim 10, column 34, line 49, "communication network includes" should read --communication network that includes--.

Claim 13, column 35, line 15, "1394 standard and USB standard." should read --1394 standard and a USB standard.--.

Claim 24, column 36, line 46, "recording medium according claim 23," should read --recording medium according to claim 23,--.

Signed and Sealed this

Twenty-third Day of October, 2007

JON W. DUDAS
*Director of the United States Patent and Trademark Office*